US005322487A

United States Patent [19]

Nagano

[11] Patent Number: 5,322,487

[45] Date of Patent: Jun. 21, 1994

[54] SELF-CONTAINED CHANGE SPEED APPARATUS WITH SHAPED PAWLS TO EQUALIZE A SHIFTING SPRING FORCE FOR A BICYCLE

[75] Inventor: Masashi Nagano, Izumi, Japan

[73] Assignee: Shimano, Inc., Osaka, Japan

[21] Appl. No.: 112,976

[22] Filed: Aug. 30, 1993

Related U.S. Application Data

[63] Continuation of Ser. No. 854,589, Mar. 20, 1992, abandoned.

[30] Foreign Application Priority Data

Sep. 9, 1991 [JP] Japan ................................ 3-228955
Sep. 9, 1991 [JP] Japan ................................ 3-228956

[51] Int. Cl.[5] ........................ F16H 3/74; F16H 57/10

[52] U.S. Cl. .................................. 475/297; 192/6 A; 192/47; 192/482.9; 192/64

[58] Field of Search ............... 475/296, 297; 192/6 A, 192/47, 48.92, 64

[56] References Cited

U.S. PATENT DOCUMENTS

| | | | |
|---|---|---|---|
| 3,432,013 | 3/1969 | Matsumoto | 192/6 A |
| 4,437,552 | 3/1984 | Toyama | 192/48.92 X |
| 4,702,486 | 10/1987 | Tsuchie | 192/64 X |
| 4,721,013 | 1/1988 | Steuer er al. | 192/6 A X |
| 4,973,297 | 11/1990 | Bergles | 192/6 A X |
| 5,078,664 | 1/1992 | Nagano | 475/296 X |

FOREIGN PATENT DOCUMENTS

| | | |
|---|---|---|
| 383350 | 8/1990 | European Pat. Off. . |
| 2136065 | 9/1984 | United Kingdom . |
| 2166503 | 5/1986 | United Kingdom . |

*Primary Examiner*—Leslie A. Braun
*Assistant Examiner*—Khoi Q. Ta
*Attorney, Agent, or Firm*—Dickstein, Shapiro & Morin

[57] ABSTRACT

A self-contained change speed apparatus for use on a bicycle having a fixed shaft, a drive member and a hub body rotatably supported on the fixed shaft, and a change speed device disposed between the drive member and hub body. The change speed device includes a plurality of clutches and a clutch controller. The clutches are subjected to a resistance to disengagement corresponding to a drive torque. The clutch controller includes a shiftable first control member, a spring for storing a shift of the first control member as energy, and a shiftable second control member operable by the spring for operating the clutches. The second control member shifts to disengage the clutches when the first control member shifts and the spring imparts a force greater than the resistance to disengagement for shifting the second control member. The second control member remains stationary when the first control member shifts and the spring imparts a force less than the resistance to disengagement, the second control member being shiftable to disengage the clutches only when the force of the spring exceeds the resistance to disengagement. The clutches are shaped and arranged such that forces for overcoming the resistance to disengagement are substantially the same for all of the clutches.

11 Claims, 25 Drawing Sheets

C
R
60
27
35
34
K
1a
2
2a
19
40
42
44
19a
52
51
20a
20
20b
3a
16a
16
5a
47
14b
14a
13b
13a
5
18b
18
18a
15
12b
12a
3
11b
11a
4
17b
17
17a
3a
9
6
48
49
4a
1
50
28
21b
21a
21
8
22a
22b
22
23a
23
23b
24a
24
24b
19b
S2
54
41
7
S1
43

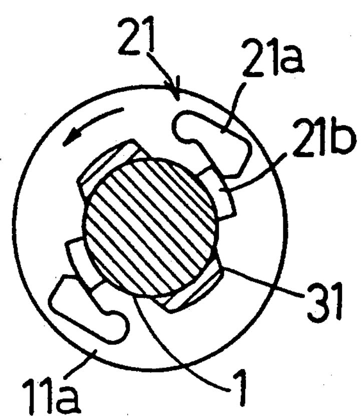
Fig. 10A (H3)
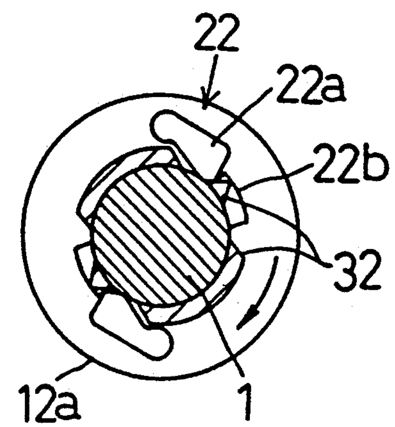
Fig. 10B (H3)
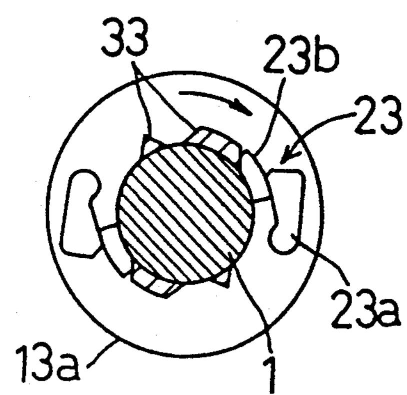
Fig. 10C (H3)

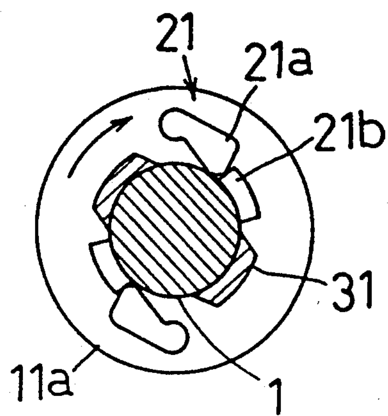
Fig. 11A (H2)
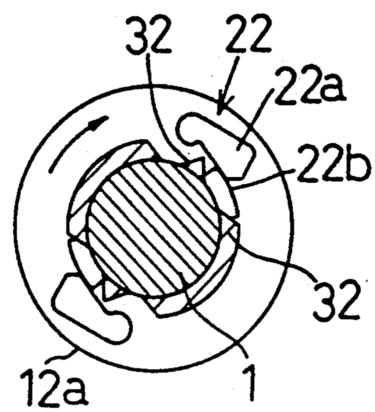
Fig. 11B (H2)
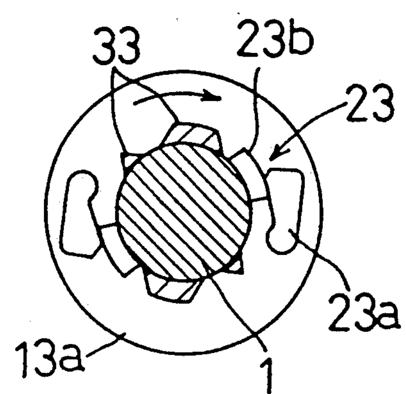
Fig. 11C (H2)

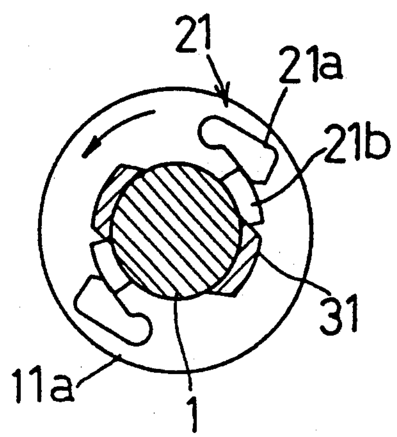
Fig. 12A(H1)
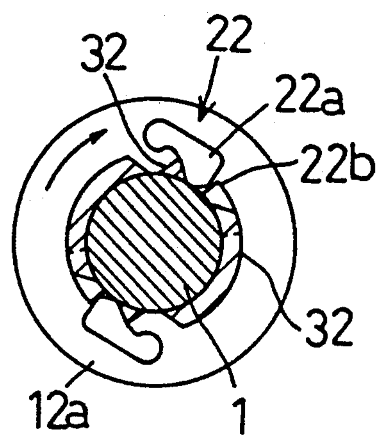
Fig. 12B (H1)
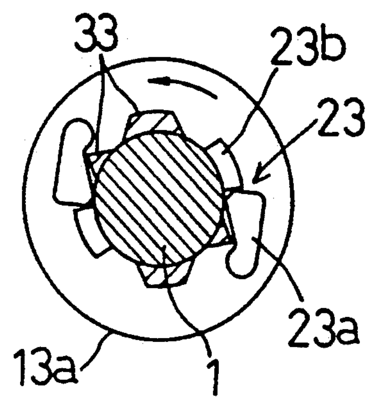
Fig. 12C(H1)

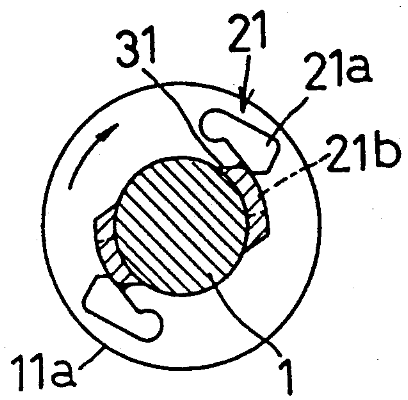
Fig. 15A(L2)
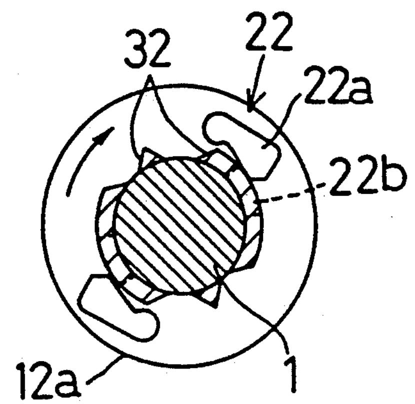
Fig. 15B(L2)
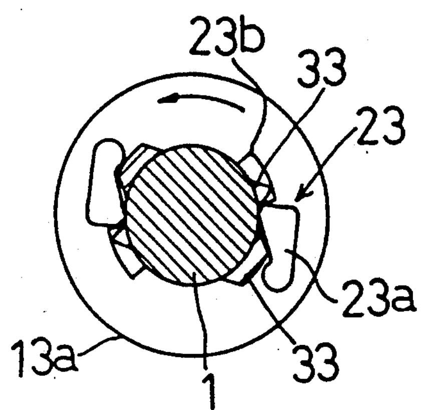
Fig. 15C(L2)

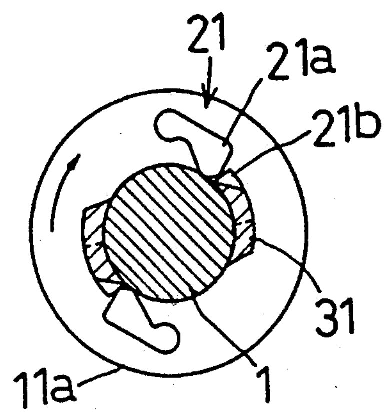
Fig. 16A(L1)
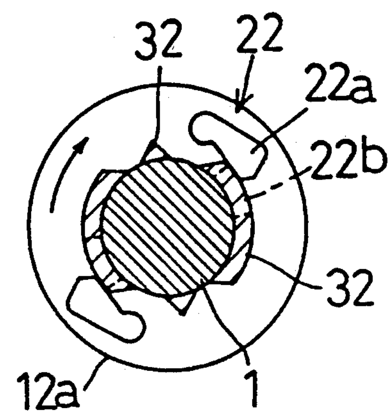
Fig. 16B(L1)
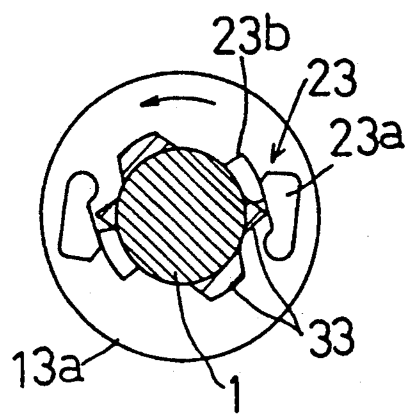
Fig. 16C(L1)

2a
63
62
2b
71
2
63
74a
3
66
66a
74
68
3a
68a
78
75
70
74b
69
69a
3b
63
62
79
85
67a
61b
67
76a
72
88
76
73
80
E
76b
61a
77
61
81
82
83
84
H
M
L 2a
63
62
2b
67
2
67a
63
71
74a
61b
85
3
66
72
76a
66a
74
68
76
88
3a
68a
73
80
78
75
E
70
76b
74b
69
77
61a
69a
84
H
M
L
83
3b
63
62
82
81
61
79

2a
63
62
2b
67
2
63
67a
71
74a
85
3
66
72
66a
74
76a
88
68
3a
76
68a
80
78
75
E
70
76b
73
74b
69
77
61a
69a
3b
61
79
61b
84
83
H
M
L
63
62
82
81

SELF-CONTAINED CHANGE SPEED APPARATUS WITH SHAPED PAWLS TO EQUALIZE A SHIFTING SPRING FORCE FOR A BICYCLE

This application is a continuation of application Ser. No. 07/854,589 filed Mar. 20, 1992, now abandoned.

BACKGROUND OF THE INVENTION

1. Field of the Invention

The present invention relates to an improvement in a clutch mechanism mounted in a self-contained change speed apparatus for use on a bicycle.

2. Description of the Related Art

Conventional self-contained change speed apparatus, as disclosed in U.S. Pat. No. 5,078,664 and U.K. Patent application GB2166503A, employ a plurality of clutches in the form of pawl clutches and claw clutches and a clutch controller for providing multistage speeds. In these examples, operation of a shift lever is transmitted directly to the clutch controller. Consequently, a shift of the shift lever simultaneously results in a shift of the clutch controller with no substantial "lag" therebetween.

On the other hand, a drive torque is applied to engaging regions of a claw clutch, which acts as a resistance to disengagement of the claw clutch to impede smooth operation of the clutch controller. In the case of a bicycle, drive is variable with pedal positions, that is drive is weaker in upper and lower dead point regions for reasons of human engineering, with the result that diminished torque acts on the clutches. Consequently, only a minimum operating force is required for a smooth change speed operation if the clutches are operated when the pedals are in the upper and lower dead point regions. However, it is extremely difficult to operate the shift lever with such timing. Normally, therefore, a change speed operation is carried out with a great operating force overcoming a considerable resistance to disengagement. This involves an unsmooth clutch operation and shocks of shifting.

In the art of claw clutches, a spring or the like is sometimes incorporated into an individual clutch mechanism in order to avoid an overload. This results in a "lag" of the clutch controller, whereby the clutch is operated in a low disengagement resistance condition. However, the individual clutch mechanisms are not designed to cooperate with one another, nor are the clutches and springs. Thus, the addition of such springs makes little contribution to smooth operation of the change speed apparatus.

SUMMARY OF THE INVENTION

An object of the present invention is to provide a self-contained change speed apparatus for automatically effecting change speed in upper and lower dead point regions of the pedals where transmitted torque becomes weak.

The above object is fulfilled, according to the present invention, by a self-contained change speed apparatus comprising a plurality of clutches, and a clutch control device for operating the clutches. The clutches are subjected to a resistance to disengagement corresponding to a drive torque. The clutch control device includes a shiftable first control member, an elastic member for storing a shift of the first control member as energy, and a shiftable second control member operable by the elastic member for operating the clutches. The clutches are shaped and arranged such that force of the elastic member for overcoming the resistance to disengagement is substantially the same for all of the clutches.

The above construction has the following functions. The second control member shifts to disengage the clutches when the first control member shifts and the elastic member imparts a force greater than the resistance to disengagement for shifting the second control member. The second control member remains stationary when the first control member shifts and the elastic member imparts a force less than the resistance to disengagement, the second control member being shiftable to disengage the clutches only when the force of the elastic member exceeds the resistance to disengagement.

Further, since the force of the elastic member for overcoming the resistance to disengagement is substantially the same for all of the clutches, it is possible to set the force of the elastic member to overcome the resistance to disengagement at substantially the same time as when the pedals reach the upper and lower dead points whichever speed may be selected for a bicycle run. Thus, when the cyclist attempts a change speed operation, a selected speed is not established before the pedals reach the upper and lower dead points. Change speed is actually effected at the upper and lower dead points where transmitted torque is diminished.

According to the above construction, it is unnecessary for the cyclist to carry out a change speed operation after waiting for the pedals to reach the upper and lower dead points where transmitted torque is diminished. This enables a smooth and easy change speed operation of the bicycle.

Further and other objects, features and effects of the invention will become more apparent from the following more detailed description of the embodiments of the invention with reference to the accompanying drawings.

BRIEF DESCRIPTION OF THE DRAWINGS

FIG. 10A–C is a sectional view taken on a plane perpendicular to the fixed shaft and showing relations among sun pawls, restrictor projections and control portions in third high-speed positions of sun clutches.

FIG. 11A–C is a sectional view taken on the plane perpendicular to the fixed shaft and showing relations among the sun pawls, restrictor projections and control sections in second high-speed positions of the sun clutches.

FIG. 12A–C is a sectional view taken on the plane perpendicular to the fixed shaft and showing relations among the sun pawls, restrictor projections and control sections in first high-speed positions of the sun clutches.

FIG. 15A–C is a sectional view taken on the plane perpendicular to the fixed shaft and showing relations among the sun pawls, restrictor projections and control sections in second low-speed positions of the sun clutches.

FIG. 16A–C is a sectional view taken on the plane perpendicular to the fixed shaft and showing relations among the sun pawls, restrictor projections and control sections in third low-speed positions of the sun clutches.

DETAILED DESCRIPTION OF THE PREFERRED EMBODIMENTS

A first embodiment of the present invention will be described hereinafter with reference to the drawings.

Figure 1:
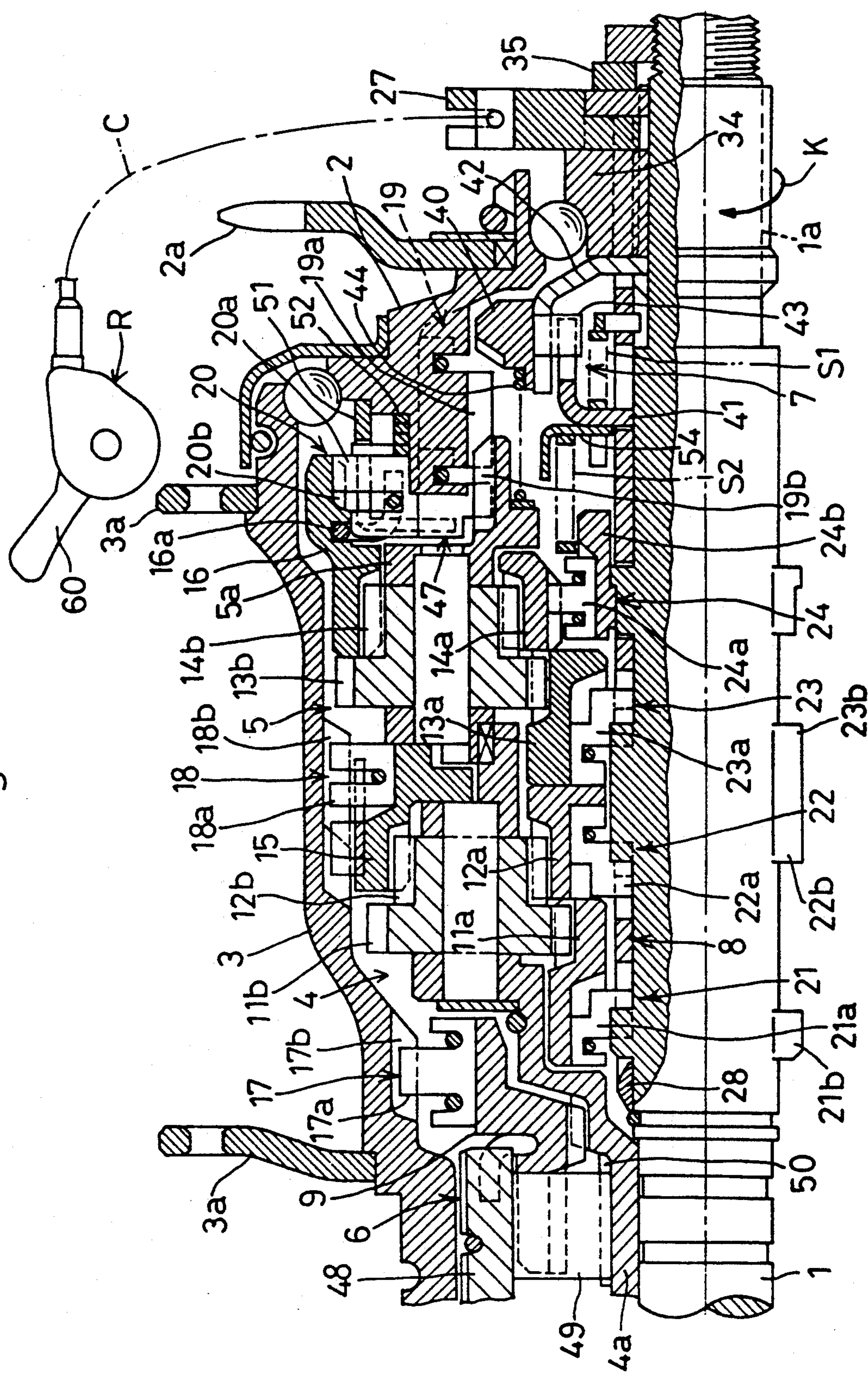
FIG. 1 is a sectional view of a self-contained change speed apparatus for providing seven speeds.

As shown in FIG. 1, a self-contained change speed apparatus according to the present invention, broadly, comprises a fixed shaft 1 secured to a bicycle frame, and a drive member 2 and a hub body 3 rotatably supported on the fixed shaft 1. The drive member 2 has a chainwheel 2*a*, and the hub body 3 has hubs 3*a* for supporting spokes. A drive transmission line from the drive member 2 to the hub body 3 includes an accelerating first planetary gear mechanism 4 and a decelerating second planetary gear mechanism 5. A coaster brake 6 is provided on a side remote from the drive member 2. As will be described later, the drive transmission line is switchable by a clutch operating mechanism 7, and a tubular clutch control member 8 is rotatably mounted on the fixed shaft 1 for controlling the clutch operating mechanism 7 and for controlling control sections of sun gears to allow or prohibit rotation of sun gears. This embodiment provides seven speed stages as described later.

The two planetary gear mechanisms 4 and 5 include a first and a second gear carriers 4*a* and 5*a*, respectively, which are relatively unrotatably engaged with each other. The first carrier 4*a* is relatively unrotatably engaged with a relay member 9 disposed adjacent the coaster brake 6. The first planetary gear mechanism 4 further includes a first and a second sun gears 11*a* and 12*a*. The second planetary gear mechanism 5 further includes a third and a fourth sun gears 13*a* and 14*a*. The first to fourth sun gears 11*a*–14*a* are supported on the fixed shaft 1 to be rotatable independently of one another and axially immovable. The first and second sun gears 11*a* and 12*a*, respectively, are meshed with first and second planet gears 11*b* and 12*b*, each pair of first and second planet gears being formed integral. The third and fourth sun gears 13*a* and 14*a*, respectively, are meshed with third and fourth planet gears 13*b* and 14*b*, each pair of third and fourth planet gears being formed integral also. The second planet gears 12*b* are meshed also with a first ring gear 15. The fourth planet gears 14*b* are meshed also with a second ring gear 16. Selective free wheeling and locking controls of the sun gears 11*a*, 12*a*, 13*a* and 14*a* relative to the fixed shaft 1 are carried out by the clutch control member 8 as described in detail later.

The first ring gear 15 and relay member 9 are selectively used as an output element to act on the hub body 3. The second ring gear 16 and second gear carrier 5*a* are selectively used as an input element to receive drive from the drive member 2. One-way clutches are employed to effect selective drive transmission between these components. These one-way clutches include a first transmission clutch 17 provided between the relay member 9 and hub body 3, a second transmission clutch 18 provided between the first ring gear 15 and hub body 3, a third transmission clutch 19 provided between the second gear carrier 5*a* and drive member 2, and a fourth transmission clutch 20 provided between the second ring gear 16 and drive member 2. These one-way clutches also include first to fourth transmission ratchet pawls 17*a*, 18*a*, 19*a* and 20*a*, and first to fourth transmission ratchet teeth 17*b*, 18*b*, 19*b* and 20*b*, respectively. The transmission pawls 17*a*, 18*a*, 19*a* and 20*a* are constantly spring-loaded for engagement with the corresponding transmission teeth 17*b*, 18*b*, 19*b* and 20*b*. The first transmission pawls 17*a* are attached to the relay member 9, the second transmission pawls 18*a* to the first ring gear 15, and the third and fourth transmission pawls 18*a* and 19*a* to the drive member 2. The transmission pawls 17*a*, 18*a*, 19*a* and 20*a* are oriented such that the hub body 3, second gear carrier 5*a* or second ring gear 16 is driven only when the components carrying the pawls are rotated in the direction of arrow K in FIG. 1. The third transmission pawls 19*a* are meshed with the third transmission teeth 19*b* over an entire width thereof, and the third transmission clutch 19 is operable by the clutch operating mechanism 7 described later.

Figure 24:
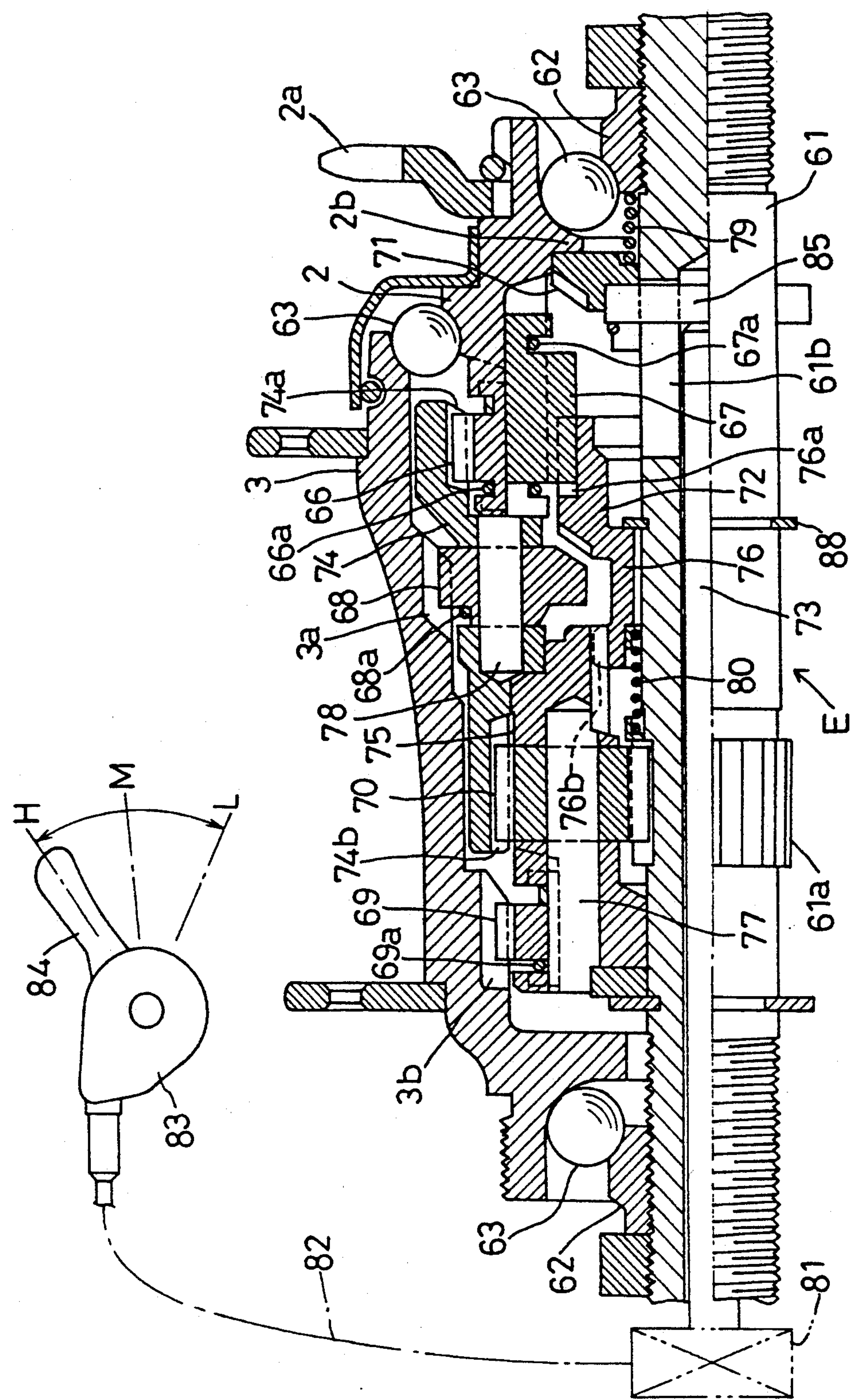
FIG. 24 is a sectional view of a three-stage change speed apparatus in a high speed state.

As shown in FIGS. 1 and 10 through 17, a first to a fourth sun clutches 21, 22, 23 and 24 formed as one-way clutches are arranged between the fixed shaft 1 and the first to fourth sun gears 11*a*, 12*a*, 13*a* and 14*a*. These sun clutches 21, 22, 23 and 24 include first to fourth sun pawls 21*a*, 22*a*, 23*a* and 24*a* attached to inner peripheral walls of the first to fourth sun gears 11*a*, 12*a*, 13*a* and 14*a* and constantly urged toward the fixed shaft 1, respectively. The fixed shaft 1 defines first and second restrictor projections 21*b* and 22*b* engageable with the first to third sun pawls 21*a*, 22*a* and 23*a* for preventing the respective sun gears from rotating in one direction around the fixed shaft 1. The second restrictor projections 22*b* are used for both the second and third sun pawls 22*a* and 23*a*. The first and second sun clutches 21 and 22 allow rotation opposite of the driving direction K relative to the fixed shaft 1, while the third sun clutch 23 allows rotation in the driving direction K relative to the fixed shaft 1 (as will be readily understood by referring to FIGS. 10 through 16). The first sun gear 11*a* has a small diameter, and includes a portion extending leftward for forming the first sun clutch 21. Numeral 24*b* in FIG. 1 denotes a pawl attaching element as shown in FIG. 24, which is unrotatably mounted on the fixed shaft 1 to form a pawl attaching portion of the fixed shaft 1.

Figure 1A:
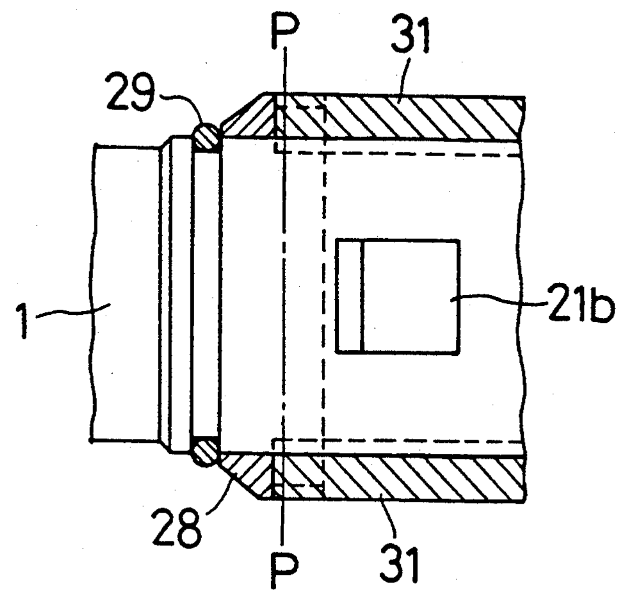
FIG. 1A is a vertical section of FIG. 1 showing details of a structure in which a first sleeve is supported by a guide bush.
Figure 1B:
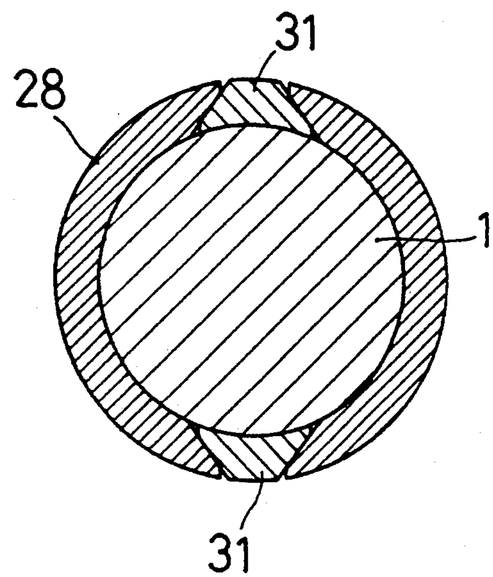
FIG. 1B is a section taken on line P—P of FIG. 1A.
Figure 4:
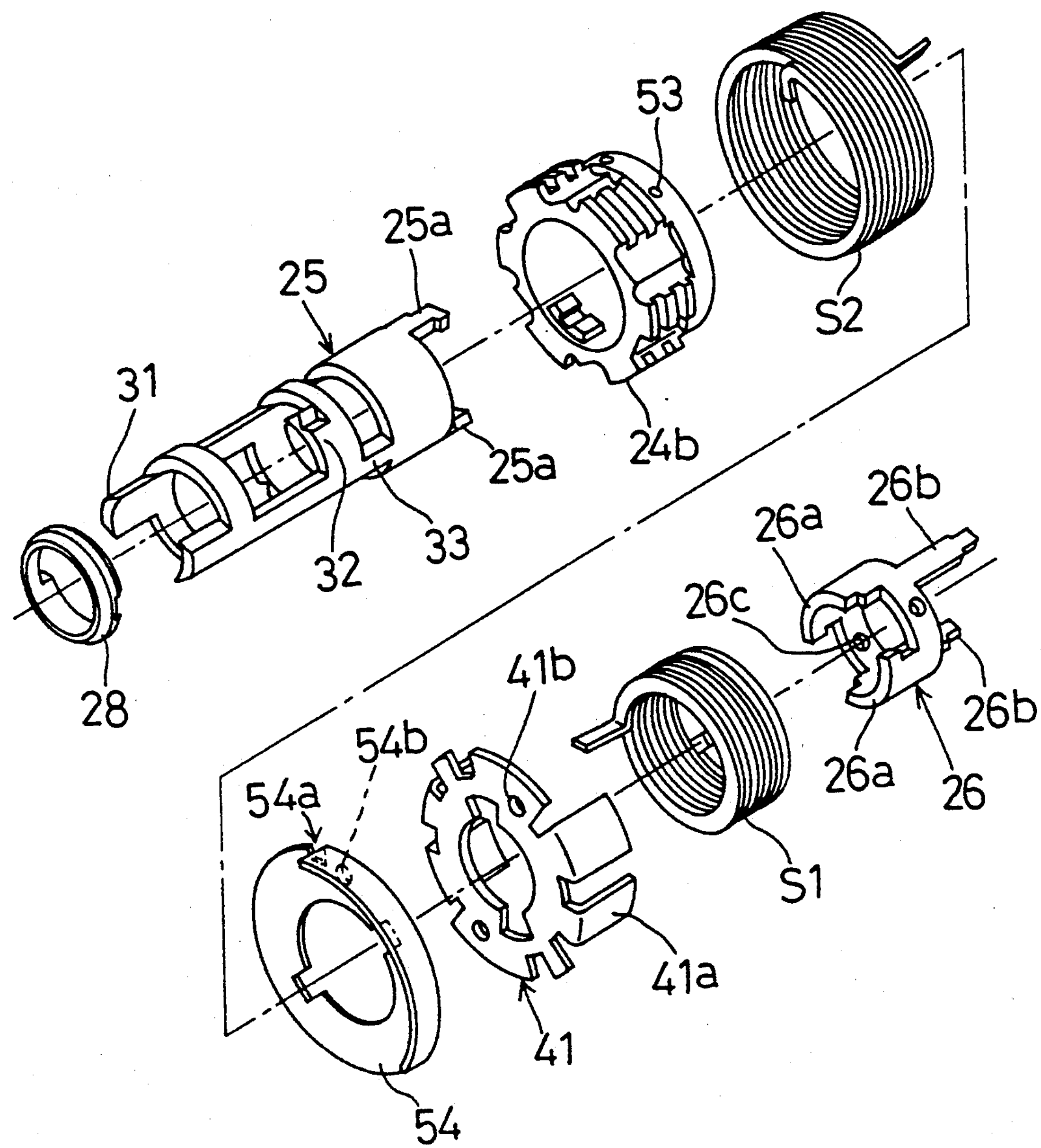
FIG. 4 is a perspective view of a control member and springs.
Figure 8:
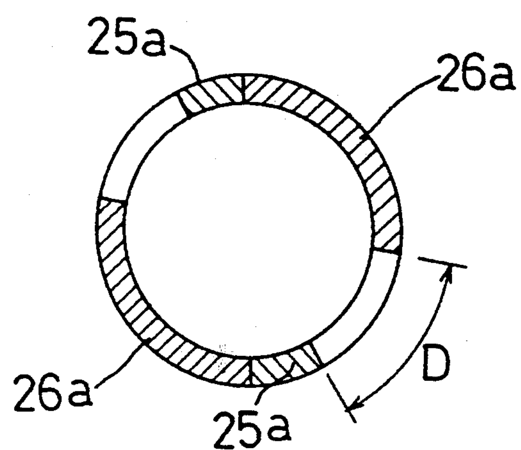
FIG. 8 is a sectional view of the control member showing engagement between a first fork and a second fork.

As shown in FIGS. 1 and 4, the clutch control member 8 includes a first sleeve 25 (an example of a shiftable control member) and a second sleeve 26 (an example of a shiftable control member) rotatably mounted on the fixed shaft 1 and arranged in order from a position adjacent the coaster brake 6, and a wire catch 27 for engaging a nipple of a control wire C. The first sleeve 25 defines a first fork 25*a* extending rightward. The second sleeve 26 defines a second fork 26*a* and a third fork 26*b* extending leftward and rightward, respectively. As shown in FIGS. 1A and 1B, the sleeve 25 includes, mounted on an end thereof adjacent the coaster brake 6, a guide bush 28 for reinforcement, i.e. for preventing the end of the sleeve 25 from flexing radially and circumferentially of the fixed shaft 1, and a retainer spring 29 for preventing the sleeve 25 from moving axially of the fixed shaft 1 toward the coaster brake 6. The two sleeves 25 and 26 are coaxially arranged to be rotatable relative to each other only through a predetermined angle D, as shown in FIG. 8, owing to a difference between a space between prongs of the second fork 26*a* circumferentially of the sleeve 26 and the thickness of a prong of the first fork 25*a* circumferentially of the sleeve 25. Beyond the angle D the sleeves 25 and 26 are rotatable together through contact between the first fork 25*a* and second fork 26*a*. A cam element 41 is provided to be rotatable with the first sleeve 25 through engagement with the first fork 25*a*. A first spring S1 is connected at one end thereof to a spring attaching bore 41*b* defined in the cam element 41, and the other end to a spring attaching bore 26*c* defined in the second sleeve 26. The first and second sleeves 25 and 26 are interlocked through the first spring S1 such that the first sleeve 25 is rotatable with the second sleeve 26 when the second sleeve 26 rotates in the direction opposite to the driving direction K, and that the second sleeve 26 is rotatable through the predetermined angle D relative to the first sleeve 25 when a rotational resistance exceeding a predetermined value is applied to the first sleeve 25. Extreme ends of the third fork 26*b* are engaged with grooves 27*b* formed on projections 27*a* extending toward the center from inner peripheral walls of the wire catch 27. Thus, the control member 8 as a whole is rotatable relative to the fixed shaft 1.

A second spring S2 is connected at one end thereof to a spring attaching bore 53 defined in the pawl attaching element 24*b*, and the other end to a spring attaching cutout 54*a* defined in a spring bearing plate 54. The spring bearing plate 54 also defines a spring attaching bore 54*b* for engaging the first spring S1. Thus, the spring bearing plate 54 is engaged with the sleeve 25 through the first spring S1 and cam element 41. When the clutch control member 8 rotates in the direction opposite to the driving direction K, the second spring S2 is wound by the sleeve 25, thereby biasing the sleeve 25 to rotate backward in the driving direction K.

The springs S1 and S2 are formed as torsion coil springs to produce an elastic restoring force as a result of torsion. These springs S1 and S2 are mounted on the fixed shaft 1 to be inside the change speed apparatus.

The sun gear clutches 21, 22 and 23 are operable with rotation of the first sleeve 25. As shown in FIG. 4, the first sleeve 25 includes a first control section 31, a second control section 32 and a third control section 33. As shown in FIGS. 10 through 16, these control sections may be combined with the first and second restrictor projections 21*b* and 22*b* to push the first to third sun pawls 21*a*, 22*a* and 23*a* toward the first to third sun gears 11*a*, 12*a* and 13*a* and out of engagement with the fixed shaft 1, and to prevent engagement between the restrictor projections 21*b* and 22*b* and the first to third sun pawls 21*a*, 22*a* and 23*a*, thereby allowing free wheeling of the sun gears 11*a*, 12*a* and 13*a*. When the first to third control sections 31, 32 and 33 are out of cooperation with the first and second restrictor projections 21*b* and 22*b*, the first to third sun pawls 21*a*, 22*a* and 23*a* are erected under the biasing force thereof for engaging the fixed shaft 1. Then the first to third sun pawls 21*a*, 22*a* and 23*a* engage the restrictor projections 21*b*, 22*b* and 23*b* to lock the first to third sun gears 11*a*, 12*a* and 13*a* against rotation. It is to be noted that the fourth sun clutch 24 requires no control.

Figure 5:
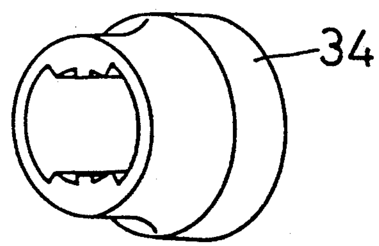
FIG. 5 is a perspective view of a ball pushing element.
Figure 6:
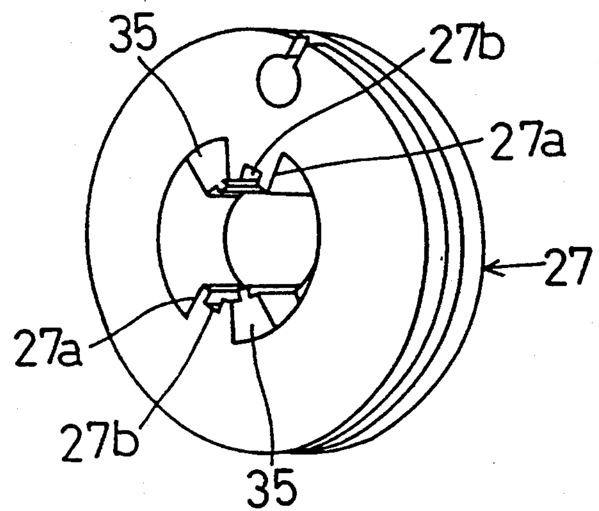
FIG. 6 is a perspective view of a wire catch.
Figure 7:
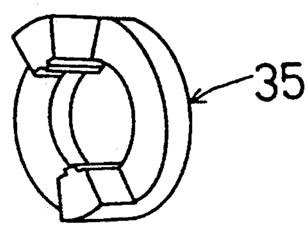
FIG. 7 is a perspective view of a rotation restrictor.

As shown in FIG. 1, the wire catch 27 is mounted between a ball pushing element 34 as shown in FIG. 5 and a rotation restrictor 35 as shown in FIG. 7. The rotation restrictor 35 contacts the projections 27*a* to limit angles of rotation of the control member 8 within a predetermined range. The ball pushing element 34 and rotation restrictor 35 are engaged with a fixing groove 1*a* defined on the fixed shaft 1 not to be rotatable relative thereto. Numeral 36 in FIG. 1 denotes a retainer nut for maintaining the various components in place. Balls are mounted between the ball pushing element 34 and drive member 2 and between the drive member 2 and hub body 3 to allow relative rotation.

Figure 21:
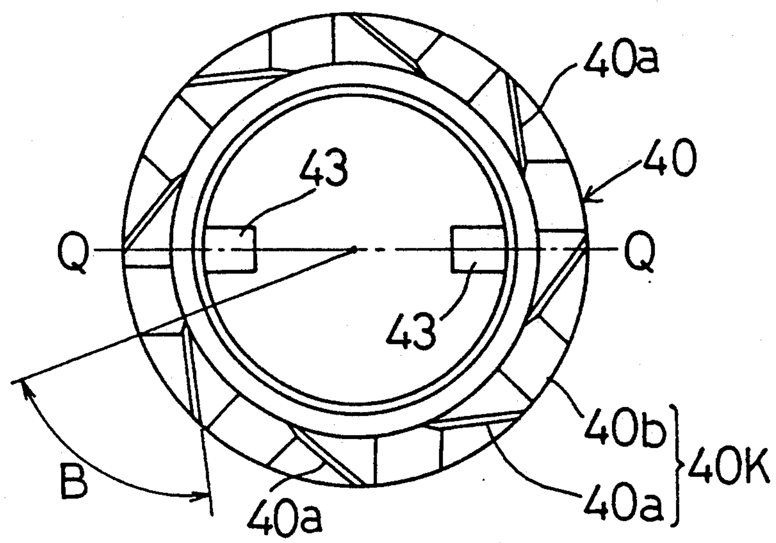
FIG. 21 is a front view of a clutch operator.
Figure 22:
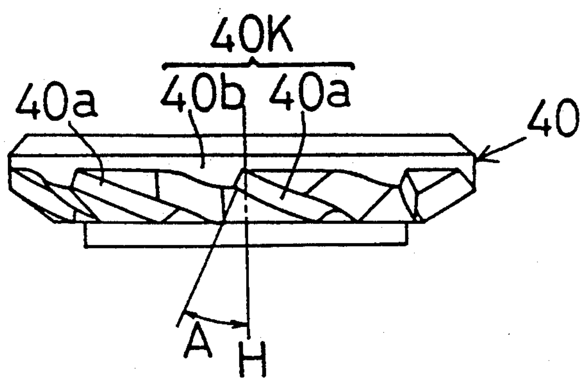
FIG. 22 is a side view of the clutch operator.

As shown in FIG. 1, the clutch operating mechanism 7 includes a clutch operator 40 for raising the third transmission pawls 19*a* by means of the biasing force into engagement with the carrier 5*a* to engage the third transmission clutch 19 and for turning the third transmission pawls 19*a* toward the drive member 19 away from the carrier 5*a* to disengage the third transmission clutch 19, a fixed plate 42 for axially movably supporting the clutch operator 40, and the annular cam element 41 unrotatably engaging the first fork 25a and rotatably fitted inside the fixed plate 42. The fixed plate 42 is engaged with the fixing groove 1a not to be rotatable relative to the fixed shaft 1. The clutch operator 40 has inner peripheries thereof fitted to the fixed plate 42, whereby the clutch operator 40 is not rotatable relative to the fixed shaft 1. The cam element 41, as shown in FIG. 4, includes a fork 41a which receives, between prongs thereof, pins 43 extending inwardly from the fixed plate 42 of the clutch operator 40 to transmit torque from the clutch control member 8 to the pins 43 to rotate the clutch operator 40. The cam element 41 is contactable through the fixed plate 42 by the ball pushing element 34 to be limited in rightward movement. When heads of the pins 43 press fit in the clutch operator 40 and acting as cam followers are pushed, the clutch operator 40 moves leftward. The clutch operator 40 includes control portions 40K as shown in FIGS. 21 and 22 for contacting the third transmission pawls 19a. The control portions 40K include a first contact 40a for contacting the third transmission pawls 19a and raising and reclining these pawls to outer peripheries of the clutch operator 40, and a second contact 40b for contacting the third transmission pawls 19a and maintaining these pawls in the reclined position. The clutch operator 40 is urged to return rightward by a compression spring 44.

The coaster brake 6 is operable when the drive member 2 rotates backward to rotate the gear carriers 4a and 5a backward through a one-way brake clutch 47 provided between the drive member 2 and second gear carrier 5a. The coaster brake 6 includes brake shoes 48 arranged annularly and opposed to a braking inside surface 3b of the hub body 3, a plurality of rollers 49 arranged on inside surfaces of the brake shoes 48, and cam surfaces formed on the first gear carrier 4a for radially outwardly pushing the rollers 49 when the first gear carrier 4a rotates backward.

Figure 2:
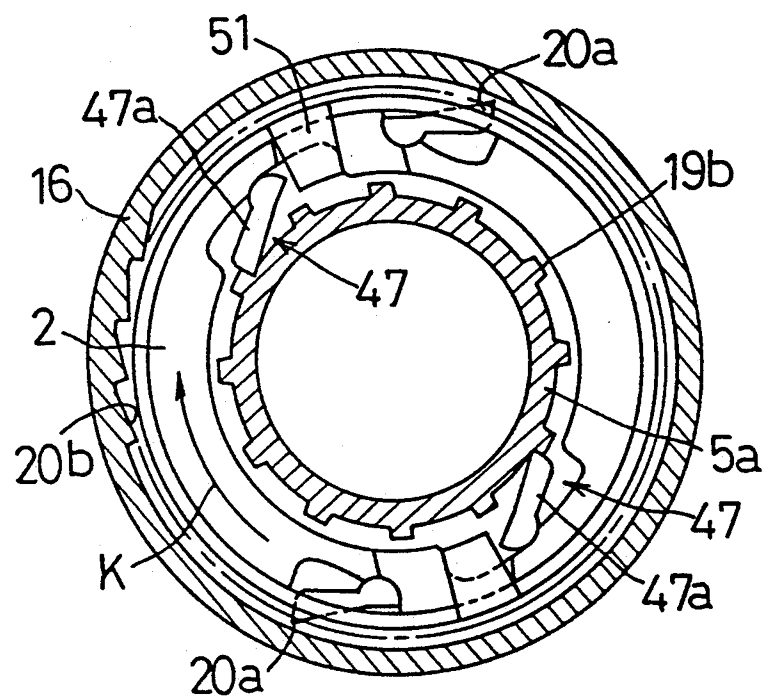
FIG. 2 is a sectional view taken on a plane perpendicular to a fixed shaft and showing a relationship between a brake clutch and fourth transmission pawls, as seen in a direction from a drive member to a coaster brake.
Figure 3:
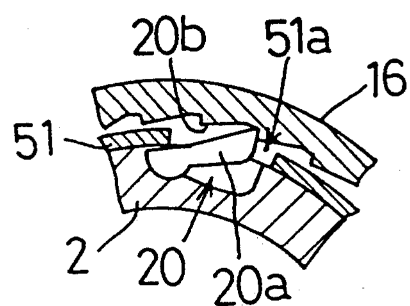
FIG. 3 is a fragmentary sectional view of FIG. 2 taken on a plane perpendicular to the fixed shaft and showing a relationship between a fourth transmission pawl and a pawl cage.

As shown in FIGS. 1 through 3, the brake clutch 47 includes braking ratchet pawls 47a and the third transmission teeth 19b. The braking pawls 47a are constantly spring-loaded toward the third transmission teeth 19b, and oriented in an opposite direction to the third transmission clutch 19. The fourth transmission pawls 20a project toward the fourth transmission teeth 20b through cutouts 51a formed in an annular pawl cage 51. The pawl cage 51 includes portions thereof extending to proximal ends of the braking pawls 47a. The proximal ends of the braking pawls 47a are movable relative to the drive member 2 when the braking pawls 47a are engaged with the third transmission teeth 19b. The movement of these proximal ends moves the cage 51 and the cutouts 51a relative to the drive member 2 through the projecting pieces, thereby to recline the fourth transmission pawls 20a to disengage the fourth transmission clutch 20. Consequently, the coaster brake 6 is operable through the brake clutch 47 and gear carriers 4a and 5a when the drive member 2 rotates backward, without interference by the fourth transmission clutch 20 and brake clutch 47. Numeral 52 in FIG. 1 denotes a torsion spring for urging the pawl cage 51 back to a position to place the fourth transmission clutch 20 in an operable position.

When, for example, the cyclist pushes the bicycle backward to rotate the rear wheel backward, backward rotation of the hub body 3 is transmitted to the drive member 2 through the planetary gear mechanisms and the four transmission pawls 20a. The backward rotation of the drive member 2 operates the braking pawls 47a to disengage the fourth transmission pawls 20a. As a result, the drive member 2 is stopped rotating backward to render the braking pawls 47a inoperable. Since the braking pawls 47a are inoperable, the fourth transmission pawls 20a rotate the drive member 2 backward again. When this is repeated, the bicycle cannot be pushed backward smoothly and noise is produced. To solve this problem, a slide spring 16a is provided for the second ring gear 16. A detailed description of the slide spring 16a is given next.

Figure 1C:
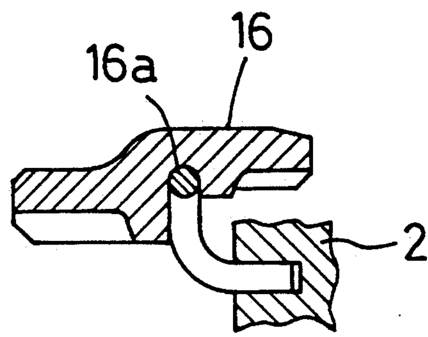
FIG. 1C is a sectional view showing how the slide spring engages with the second ring gear and the drive member.
Figure 1D:
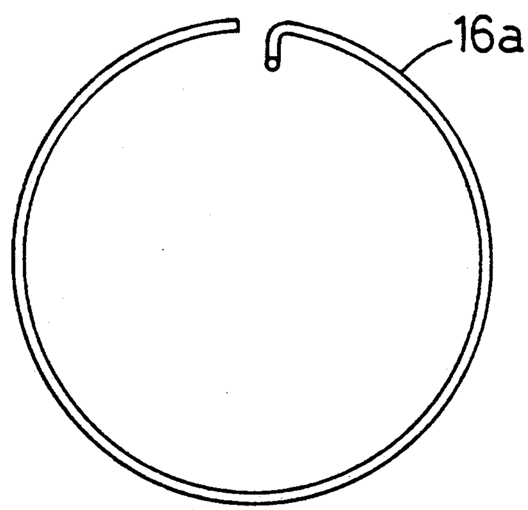
FIG. 1D shows the slide spring whose portion is shown in FIG. 1C.

As shown in FIG. 1D, the slide spring 16a is substantially circular in shape except for an end portion that is bent toward the center of the circle. The tip of the end portion is further bent so that the tip is perpendicular to the plane of the circle. As can be seen in FIG. 1C, this tip is inserted into a receiving hole formed in the drive member 2 so that the slide spring 16a and the drive member 2 rotates in unison. The slide spring 16a also has an unbent end (unnumbered) as seen in FIG. 1D.

The circular portion of the slide spring is slidably received in a groove formed in the second ring gear 16 as sectionally shown in FIG. 1C. The slide spring 16a needs to be squeezed into the groove which has a smaller diameter than the diameter of the circle of the spring so that the slide spring 16 exerts a frictional force against the surface of the groove. FIG. 1D shows the orientation of the slide spring 16a when placed in the second ring gear 16 as viewed in the axial direction toward the coaster brake 6.

When the ring gear 16 rotates, in the direction opposite to the driving direction K, as does when the bicycle operator pushes the bicycle backwards, the friction between the slide spring 16a and the groove formed in the second ring gear 16 urges the slide spring 16a to rotate in the same direction. This urges the gap between the two ends of the slide spring to expand which increases the radially outward force of the spring 16a against the groove. This, in turn, causes the friction force between the groove and the slide spring to increase, rotating the drive member 2 in unison with the ring gear 16 as a result.

On the other hand, when the second ring gear rotates in the driving direction K, relative to the drive member 2, that is when the second ring gear 16 rotates with greater angular speed than the angular speed of the drive member 2, as is the case when the driving motion is transmitted through the third transmission clutch 19, the friction force between the groove and the slide spring 16a urges the gap between the two ends of the spring to diminish which decreases the radially outward force of the slide spring against the groove to decrease. This, in turn, decrease the friction force allowing the ring gear 16 to rotate independently from the drive member 2.

The above described structure eliminates the noise problem and the problem of uneven rearward motion since the drive member 2 rotates with the second ring gear 16 in unison when the bicycle is pushed backwards which effectively avoids the unwanted engagement and disengagement of the breaking pawls 47a without resorting to an elaborate structure such as a clutch pawl and clutch teeth.

Figure 17:
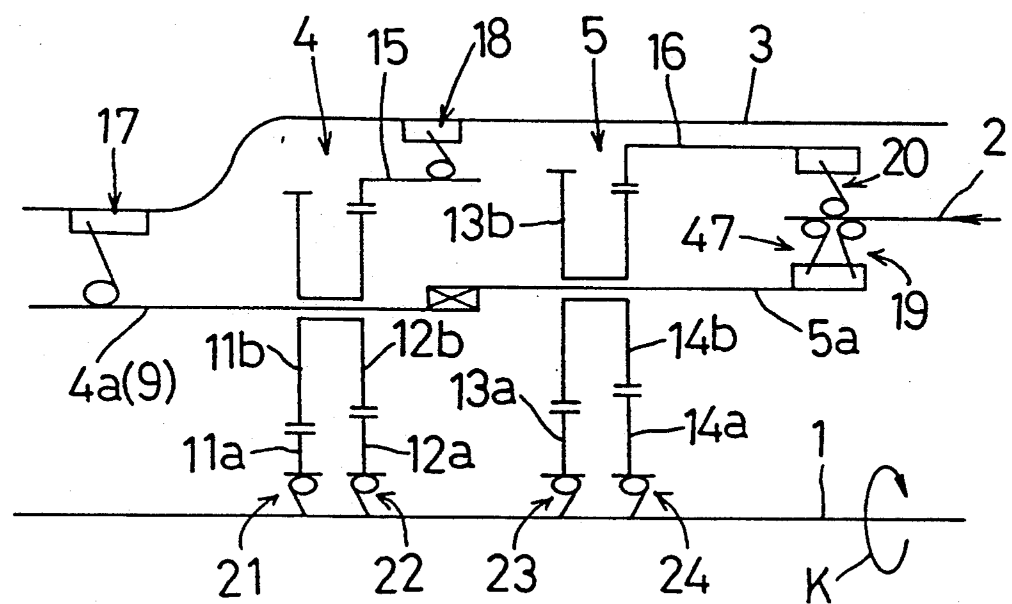
FIG. 17 is a diagram corresponding to FIG. 1.

Reference is now made to Table 1 and the drawings for describing switching of the drive transmission system, basic operations for controlling the sun gears 11a,

12*a*, 13*a* and 14*a* effected through the first planetary gear mechanism 4 and second planetary gear mechanism 5, respectively, and switching of the first to seventh speeds. In Table 1, the sign "-" signifies states in which the one-way clutches 17–24 are inoperative and relative rotation thereof is allowed, which are hereinafter referred to as "inoperative" states. The sign "O" signifies states in which the relative rotation of the one-way clutches is prohibited, which are hereinafter referred to as "engaged" states. The sign "X" signifies states in which engagement of the one-way clutches is prevented to allow the relative rotation thereof, which are hereinafter referred to as "disengaged" states. The clutches without the "X" sign require no external controls. To facilitate understanding, FIG. 17 shows a diagram of the foregoing construction.

TABLE 1

| | clutch controls | | | | | | | |
|---|---|---|---|---|---|---|---|---|
| speeds | 17 | 18 | 19 | 20 | 21 | 22 | 23 | 24 |
| H3 | — | O | O | — | — | O | — | — |
| H2 | — | O | O | — | O | X | — | — |
| H1 | — | O | X | O | — | O | O | — |
| M | — | O | X | O | — | O | X | O |
| L1 | — | O | X | O | O | X | X | O |
| L2 | O | — | X | O | X | X | O | — |
| L3 | O | — | X | O | X | X | X | O |

In the accelerating type first planetary gear mechanism 4, the first ring gear 15 has a greater angular velocity than the relay member 9 whenever one of the first and second sun clutches 21 and 22 is engaged. Consequently, the second transmission clutch 18 is engaged, while the first transmission clutch 17 is in the inoperative state. The drive transmission line then becomes an accelerating line extending from the first ring gear 15 through the second transmission clutch 18 to the hub body 3. On the other hand, when both the first and second sun clutches 21 and 22 are disengaged, the second transmission clutch 18 becomes inoperative. Then the drive transmission line forms a direct line extending from the relay member 9 through the first transmission clutch 17 to the hub body 3. Thus, in the first planetary gear mechanism 4, the drive transmission line is switchable only by controlling the first and second sun clutches 21 and 22. The first and second transmission clutches 17 and 18 require no controls as seen from the absence of sign "X" from the columns of these clutches in Table 1.

In the decelerating type second planetary gear mechanism 5, when the third transmission clutch 19 is engaged, a direct drive transmission line is formed to extend from the drive member 2 through the third transmission clutch 19 to the gear carrier 5*a*. On the other hand, when the third transmission clutch 19 is disengaged by the action of the clutch operating mechanism 7, the drive transmission line becomes a decelerating line extending from the drive member 2 through the fourth transmission clutch 20 and second ring gear 16 to the gear carrier 5*a*. Thus, in the second planetary gear mechanism 5, the drive transmission line is switchable only by controlling the clutch operating mechanism 7.

Change speed is effected by pulling the control wire C to rotate the clutch control member 8 stepwise in the direction opposite to the driving direction K. This operation controls the first to third control sections 31–33 and clutch operating mechanism 7, which in turn control the sun clutches 21–23 and third transmission pawls 19*a*. Based on the above rules, seven speeds are successively provided in the accelerating direction from the slowest, third low speed L3 to the fastest, third high speed H3. On the other hand, deceleration is effected by relaxing the control wire C to return the clutch control member 8 under the restoring force of the second spring S2 in the driving direction K, whereby the seven speeds are provided from the fastest, third high speed H3 to the slowest, third low speed L3. FIGS. 10 through 16 show positions of the first to third sun clutches 21–23 corresponding to the respective stages from the fastest, third high speed H3 to the slowest, third low speed L3.

Specifically, a shift lever type manual speed controller 60 is operable through the control wire C to rotate the clutch control member 8. The rotation of the clutch control member 8 slides the clutch operator 40 to produce the following conditions:

When the third transmission clutch 19 and second sun clutch 22 are engaged and the first and third sun clutches 21 and 23 in the inoperative state, the fourth sun clutch 24 and the first and fourth transmission clutches 17 and 20 are inoperative and the second transmission clutch 18 engaged. This produces the third high speed H3 in which the torque of the drive member 2 is transmitted to the hub body 3 through the third transmission clutch 19, carrier 5*a*, carrier 4*a*, first ring gear 15 and second transmission clutch 18.

When the third transmission clutch 19 and first sun clutch 21 are engaged, the second sun clutch 22 disengaged and the third sun clutch 23 in the inoperative state, the fourth sun clutch 24 and the first and fourth transmission clutches 17 and 20 are inoperative and the second transmission clutch 18 engaged. This produces the second high speed H2 in which the torque of the drive member 2 is transmitted to the hub body 3 through the third transmission clutch 19, carrier 5*a*, carrier 4*a*, first ring gear 15 and second transmission clutch 18.

When the third transmission clutch 19 is disengaged, the second and third sun clutches 22 and 23 engaged and the first sun clutch 21 in the inoperative state, the fourth sun clutch 24 and first transmission clutch 17 are inoperative and the second and fourth transmission clutches 18 and 20 engaged. This produces the first high speed H1 in which the torque of the drive member 2 is transmitted to the hub body 3 through the fourth transmission clutch 20, second ring gear 16, carrier 5*a*, carrier 4*a*, first ring gear 15 and second transmission clutch 18.

When the third transmission clutch 19 and third sun clutch 23 are disengaged, the first sun clutch 21 in the inoperative state and the second sun clutch 22 engaged, the fourth sun clutch 24 and the second and fourth transmission clutches 18 and 20 are engaged and the first transmission clutch 17 in the inoperative state. This produces the intermediate speed M in which the torque of the drive member 2 is transmitted to the hub body 3 through the fourth transmission clutch 20, carrier 5*a*, carrier 4*a* and second transmission clutch 18.

When the third transmission clutch 19 and the second and third sun clutches 22 and 23 are disengaged and the first sun clutch 21 engaged, the fourth sun clutch 24 and the second and fourth transmission clutches 18 and 20 are engaged and the first transmission clutch 17 in the inoperative state. This produces the first low speed L1 in which the torque of the drive member 2 is transmitted to the hub body 3 through the fourth transmission clutch 20, second ring gear 16, carrier 5*a*, carrier 4*a*, first ring gear 15 and second transmission clutch 18.

When the third transmission clutch 19 and the first and second sun clutches 21 and 22 are disengaged and the third sun clutch 23 engaged, the fourth sun clutch 24 and second transmission clutch 18 are in the inoperative state and the first and fourth transmission clutches 17 and 20 engaged. This produces the second low speed L2 in which the torque of the drive member 2 is transmitted to the hub body 3 through the fourth transmission clutch 20, second ring gear 16, carrier 5*a*, carrier 4*a*, relay member 9 and first transmission clutch 17.

When the third transmission clutch 19 and the first, second and third sun clutches 21, 22 and 23 are disengaged, the fourth sun clutch 24 and the first and fourth transmission clutch 17 and 20 are engaged and the second transmission clutch 18 in the inoperative state. This produces the third low speed L3 in which the torque of the drive member 2 is transmitted to the hub body 3 through the fourth transmission clutch 20, second ring gear 16, carrier 5*a*, carrier 4*a*, relay member 9 and first transmission clutch 17.

As shown in Table 1 and FIGS. 10 through 16, acceleration and deceleration accompany switching from erected position to reclined position of the third transmission pawls 19*a* and the sun pawls 21*a*, 22*a* and 23*a*. Further, when the bicycle is pedaled to apply drive torque to the drive member 2, transmission loads act on the transmission pawls 19*a* and the sun pawls 21*a*, 22*a* and 23*a*. Consequently, the transmission loads result in increased resistance to disengagement of the transmission pawls 19*a* and the sun pawls 21*a*, 22*a* and 23*a* from the gear carrier 5*a* and fixed shaft 1, respectively. This resistance to disengagement is varied among the pawls to be reclined. However, the operating forces are applied from the springs S1 and S2 to the clutch control member 8 and clutch operator 40, and a torque equalizing device is provided for substantially equalizing maximum drive torques applied when any of the transmission pawls 19*a* and the sun pawls 21*a*, 22*a* and 23*a* is operated to the reclined position. Thus, a change speed operation may be carried out while pedaling the bicycle. This change speed operation is effected for any target speed from third high speed H3 to third low speed L3 under the condition that the equalized maximum drive torque is applied.

Specifically, for change speed in the accelerating direction, the first spring S1 connects the first sleeve 25 and clutch operator 40 to the second sleeve 26 rotated by operation of the speed controller 60. When the resistance to disengagement of the transmission pawls 19*a* and the sun pawls 21*a*, 22*a* and 23*a* from the gear carrier 5*a* and fixed shaft 1 is less than the resilience of the first spring S1, the first spring S1 overcomes the resistance to disengagement, and rotates or slides the first sleeve 25 and clutch operator 40 immediately upon rotation of the second sleeve 26. In this way, the first sleeve 25 reclines the sun pawls 21*a*, 22*a* and 23*a*, and the clutch operator 40 reclines the transmission pawls 19*a*. When the resistance to disengagement of the transmission pawls 19*a* and the sun pawls 21*a*, 22*a* and 23*a* from the gear carrier 5*a* and fixed shaft 1 is greater than the resilience of the first spring S1, the first spring S1 is elastically deformed by the resistance to disengagement, the rotating force of the second sleeve 26 applied manually, the allowance provided by the predetermined angle D between the sleeves 25 and 26, and action of a speed control device R to retain the speed controller 60 in a selected speed position. Consequently, the first spring S1 just charges the operating force to be applied to the first sleeve 25 and clutch operator 40. The first sleeve 25 and clutch operator 40 remain inoperative and maintain the transmission pawls 19*a* and the sun pawls 21*a*, 22*a* and 23*a* in the erected position in spite of the operation of the speed controller 60. When the crank being turned reaches or approaches an upper dead point or a lower dead point to reduce the drive torque applied to the drive member 2, the resistance to disengagement of the transmission pawls 19*a* and the sun pawls 21*a*, 22*a* and 23*a* from the gear carrier 5*a* and fixed shaft 1 becomes weaker than the resilience of the first spring S1. Then, the first spring S1, with the operating force charged therein, rotates or slides the first sleeve 25 and clutch operator 40. As a result, the first sleeve 25 reclines the sun pawls 21*a*, 22*a* and 23*a*, and the clutch operator 40 reclines the transmission pawls 19*a*.

For change speed in the decelerating direction, the second spring S2 rotates or slides the first sleeve 25 and clutch operator 40 with an elastic restoring force charged therein when the second spring S2 is wound at a time of acceleration. When the resistance to disengagement of the transmission pawls 19*a* and the sun pawls 21*a*, 22*a* and 23*a* from the gear carrier 5*a* and fixed shaft 1 is less than the resilience of the second spring S2, the second spring S2 overcomes the resistance to disengagement, and rotates or slides the first sleeve 25 and clutch operator 40 immediately upon rotation of the second sleeve 26. In this way, the first sleeve 25 reclines the sun pawls 21*a*, 22*a* and 23*a*, and the clutch operator 40 reclines the transmission pawls 19*a*. When the resistance to disengagement of the transmission pawls 19*a* and the sun pawls 21*a*, 22*a* and 23*a* from the gear carrier 5*a* and fixed shaft 1 is greater than the resilience of the second spring S2, the second spring S2 is prevented from being elastically restored fully through a predetermined stroke by the resistance to disengagement, relaxation of the control wire C, and the action of the speed control device R to retain the speed controller 60 in a selected speed position. Consequently, the second spring S2 just charges the operating force to be applied to the first sleeve 25 and clutch operator 40. The first sleeve 25 and clutch operator 40 remain inoperative and maintain the transmission pawls 19*a* and the sun pawls 21*a*, 22*a* and 23*a* in the erected position in spite of the operation of the speed controller 60. When the crank being turned reaches or approaches the upper dead point or lower dead point to reduce the drive torque applied to the drive member 2, the resistance to disengagement of the transmission pawls 19*a* and the sun pawls 21*a*, 22*a* and 23*a* from the gear carrier 5*a* and fixed shaft 1 becomes weaker than the resilience of the second spring S2. Then, the second spring S2 elastically restores itself fully through the predetermined stroke, and rotates or slides the first sleeve 25 and clutch operator 40. As a result, the first sleeve 25 reclines the sun pawls 21*a*, 22*a* and 23*a*, and the clutch operator 40 reclines the transmission pawls 19*a*.

The first spring S1 and second spring S2 produce another effect as follows. When, for example, the first control section 31 and first restrictor projections 21*b* are not in perfect register, the sun pawls 21 do not fully engage the first restrictor projections 21*b*. The engagement between the sun pawls 21*a* and first restrictor projections 21*b* would remain imperfect if there were no springs S1 and S2 and the first control section 31 did not yield to the engaging force of the sun pawls 21*a* when the drive torque increases. However, in the presence of springs S1 and S2, the sun pawls 21*a*, with an increase in the drive torque, push the first control section 31 against the resilience of the springs S1 and S2, to fully engage the first restrictor projections 21*b*. This assures stability of engagement.

As factors for equalizing as much as possible the torques applied to the clutch pawls as a result of the drive from the pedals, FIGS. 18 through 23 show a first arm length L1, a second arm length L2, an angle of pawl inclination X, an overlap angle Y, a cam angle Z, a first inclination angle A and a second inclination angle B.

Figure 23:
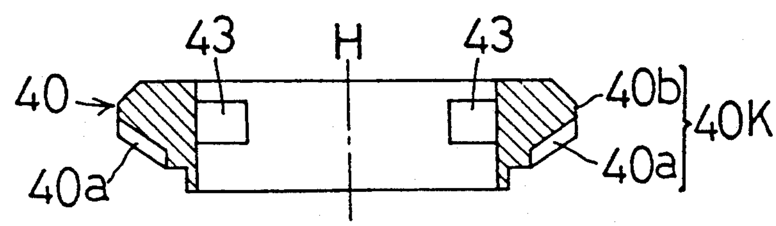
FIG. 23 is a sectional view of the clutch operator taken on line Q—Q of FIG. 21.

The cam angle Z is applicable to the transmission pawls 19*a*, which is a relative angle between resistance W to disengagement of the carrier 5*a* and reclining force F of the clutch operator 40. The reclining force F is determined from the first inclination angle A and second inclination angle B of control cam surfaces 40*a* of the clutch operator 40 as shown in FIGS. 21 through 23 which act on the transmission pawls 19*a*. The cam angle Z is variable with variations of the first inclination angle A and second inclination angle B. The first inclination angle A is an angle at which the clutch operator 40 sliding axially of the fixed shaft 1 applies camming action to the transmission pawls 19*a*. The second inclination angle B is an angle at which camming action is applied to the transmission pawls 19*a* rotating relative to the clutch operator 40.

The first arm length L1, second arm length L2, angle of pawl inclination X and overlap angle Y are applicable to the sun pawls 21*a*, 22*a* and 23*a*.

The first arm length L1 is a distance between a pivotal axis P of erection and reclination and a point at which the reclining force F of the clutch operator 40 is applied. The second arm length L2 is a distance between the pivotal axis P and a point at which the resistance W to disengagement of the fixed shaft 1 is applied. The operating force required to recline the pawls is variable with variations in the ratio between the first arm length L1 and second arm length L2 even when the resistance to reclination of the sun pawls is constant.

The pawl inclination angle X shows an angle of inclination of the sun pawls relative to the fixed shaft 1. The larger the pawl inclination angle X is, the greater the resistance to disengagement of the pawl is even when the transmission load is constant. The overlap angle Y shows a degree of overlapping between a locus of movement of a distal end of the pawl and a ratchet portion of the fixed shaft 1. The larger the overlap angle Y is, the greater the resistance to disengagement of the pawl is even when the transmission load is constant. Thus, the operating force required to recline the pawls is variable with variations in the pawl inclination angle Y and overlap angle Y.

That is, even when the drive torque is constant, the resistance of the transmission pawls 19 and sun pawls 21*a*, 22*a* and 23*a* to disengagement from the carrier 5*a* and fixed shaft 1 varies from pawl to pawl. The reclining forces of the springs S1 and S2 are variable with target speeds to be produced. However, by suitably setting the cam angle Z, ratio between the first arm length L1 and second arm length L2, overlap angle Y and pawl inclination angle X of the transmission pawls 19*a* and sun pawls 21*a*, 22*a* and 23*a*, the maximum drive torque is substantially the same for allowing any of the transmission pawls 19*a* and sun pawls 21*a*, 22*a* and 23*a* to be reclined.

Figure 9A:
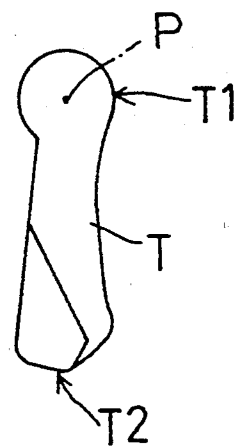
FIG. 9A–C is an explanatory view of a sun pawl.
Figure 9B:
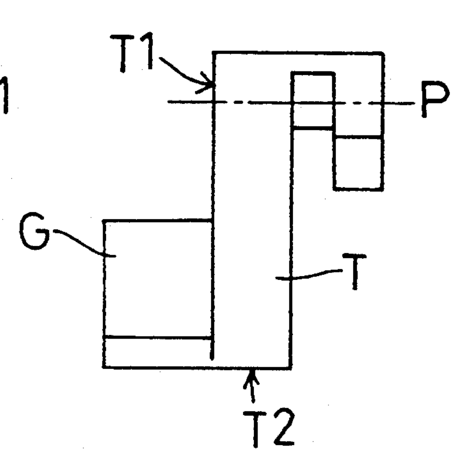
Figure 9C:
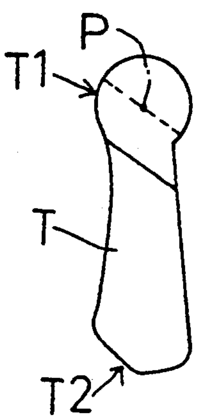
Figure 13:
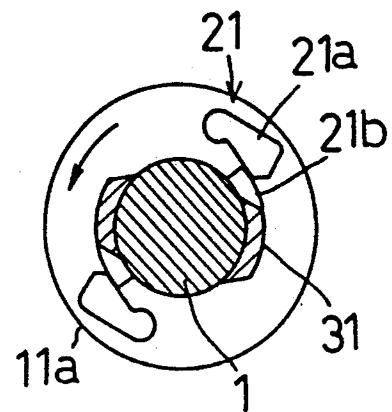
FIG. 13A–C is a sectional view taken on the plane perpendicular to the fixed shaft and showing relations among the sun pawls, restrictor projections and control sections in intermediate speed positions of the sun clutches.
Figure 13B:
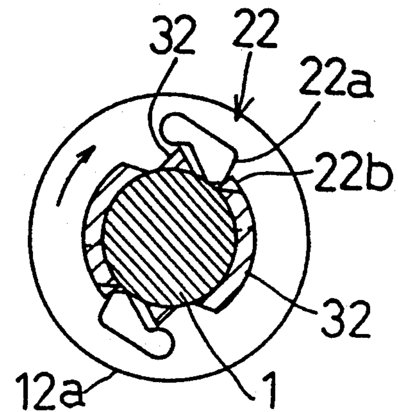
Figure 13C:
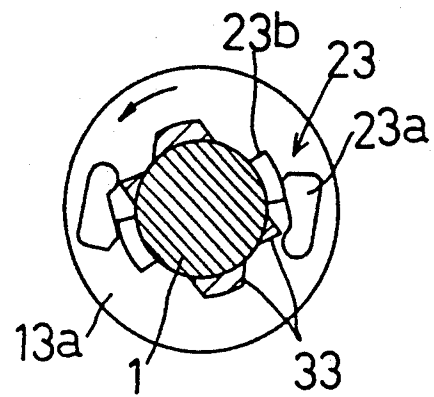
Figure 14:
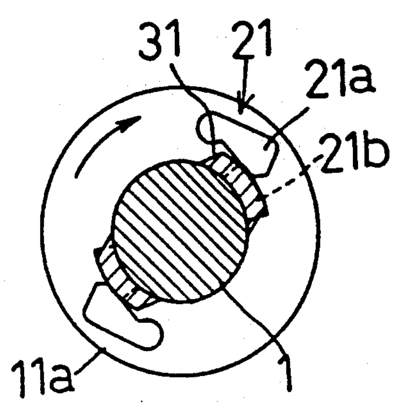
FIG. 14A–C is a sectional view taken on the plane perpendicular to the fixed shaft and showing relations among the sun pawls, restrictor projections and control sections in first low-speed positions of the sun clutches.
Figure 14:
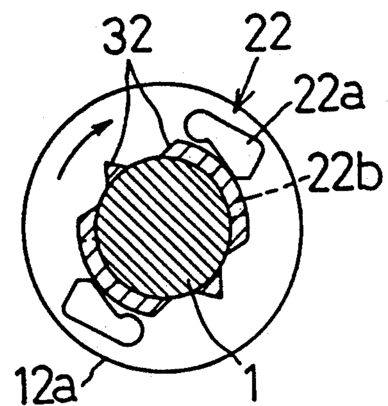
Figure 14:
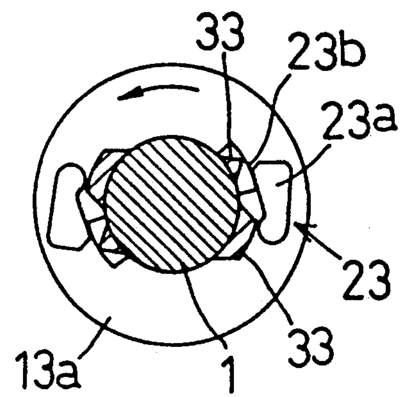

As shown in FIGS. 9(*a*)-(*c*), each of the sun pawls 21*a*, 22*a* and 23*a* has a main pawl body T supported at a proximal end T1 thereof to the sun gear 11*a*, 12*a* or 13*a* for erection and reclination about the axis P. The main pawl body T has a distal end T2 for engaging with and disengaging from the restrictor projections 21*b* or 22*b* of the fixed shaft 1. Further, the main pawl body T includes a reclining control section G formed laterally of the distal end T2 for contacting the control section 31, 32 or 33 of the first sleeve 25. The reclining control section G and main pawl body T are displaced in the direction parallel to the axis P of erection and reclination to facilitate setting a desired ratio between the first arm length L1 and second arm length L2.

A second embodiment of the present invention will be described next.

Referring to FIG. 24, a self-contained change speed apparatus for a bicycle is constructed to provide three speeds, and comprises a fixed shaft 61 unrotatably secured to a bicycle frame (not shown), and a drive member 2 and a hub body 3 rotatably supported on the fixed shaft 1 through ball pushing elements 62 and balls 63. The drive member 2 receives drive from a chainwheel 2*a*, and transmits torque to the hub body 3 in three speeds, i.e. high, intermediate and low speeds, through a main apparatus portion including a first to a fourth transmission pawls 66-69 and planet gears 70. This change speed apparatus includes a change speed control mechanism E having a first control cam 71 (an example of a shiftable control member) a second control cam 72 (an example of a shiftable control member) and a control rod 73 for switching the main apparatus portion to effect change speed. Details of this construction are as follows.

The main apparatus portion includes a first rotatable transmission member 74, a carrier 75 and a second rotatable transmission member 76 rotatably mounted on the fixed shaft 61 and drive member 2; first transmission pawls 66 disposed between the drive member 2 and first rotatable transmission member 74; second transmission pawls 67 disposed between the drive member 2 and first rotatable transmission member 76; third transmission pawls 68 disposed between the rotatable transmission member 74 and hub body 3; the planetary gears 70 attached to the carrier 75; and fourth transmission pawls 69 disposed between the carrier 75 and hub body 3.

Figure 27:
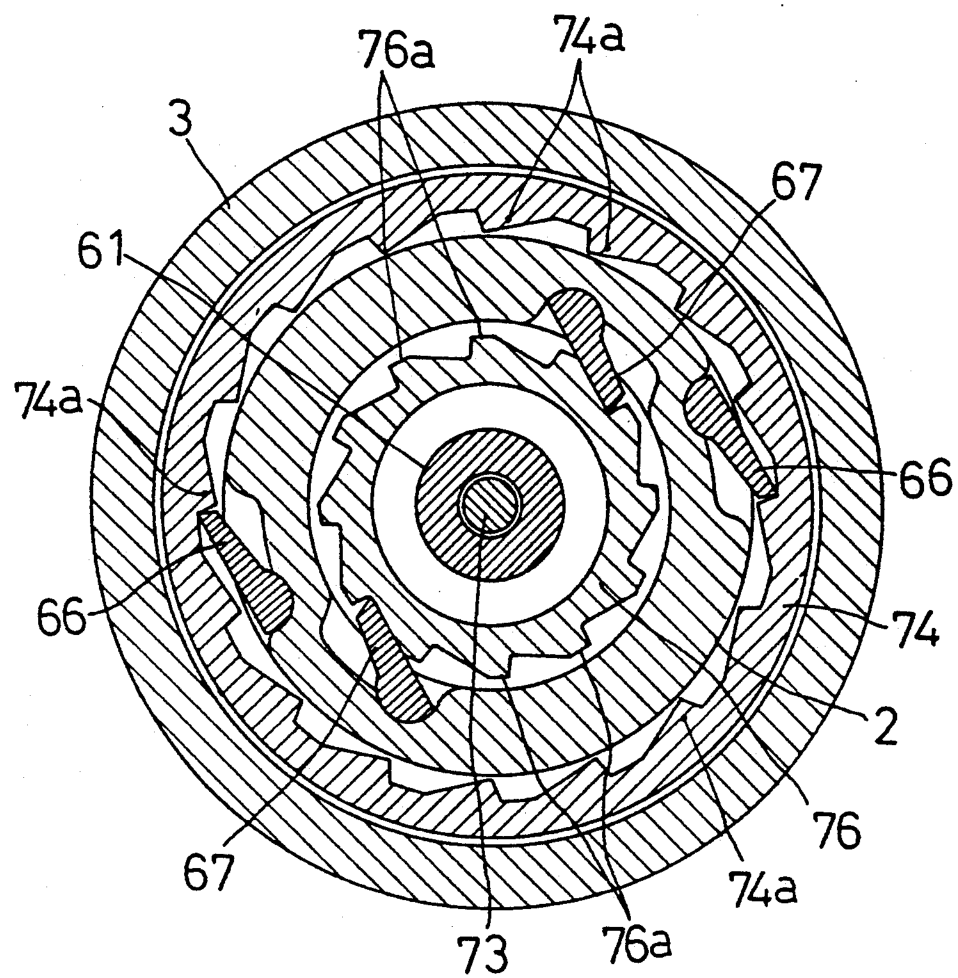
FIG. 27 is a sectional view showing relations among a second rotatable transmission member, transmission teeth, transmission pawls and a first rotatable transmission member.

As shown in FIG. 27, the first transmission pawls 66 are attached to outer peripheries of the drive member 2 to be revolvable with rotation of the drive member 2 and pivotable between an erected position and a reclined position. The first transmission pawls 66 are in the form of ratchet pawls biased by a pawl spring 66*a* to the erected position with distal ends thereof engaging driven ratchet teeth 74*a* of the first rotatable transmission member 74. A difference in rotating rate between the drive member 2 and first rotatable transmission member 74 automatically switches the first transmission pawls 66 between the erected, driving position and reclined, non-driving position. In the erected position the first transmission pawls 66, under the biasing force, engage the ratchet teeth 74*a* to transmit torque from the drive member 2 to the first rotatable transmission member 74. In the reclined position the first transmission pawls 66 are pushed by the ratchet teeth 74*a* away from the first rotatable transmission member 74 to allow rotation thereof relative to the drive member 2.

The second transmission pawls 67, as also shown in FIG. 27, are attached to inner peripheries of the drive member 2 to be revolvable with rotation of the drive member 2 and pivotable between an erected position and a reclined position. In the erected position the second transmission pawls 67 have distal ends thereof engaging transmission teeth 76a of the second rotatable transmission member 76 to transmit torque from the drive member 2 to the second rotatable transmission member 76. In the reclined position the distal ends of the second transmission pawls 67 are disengaged from the second rotatable transmission member 76 to break torque transmission from the drive member 2 to the second rotatable transmission member 76. The second transmission pawls 67 are biased by a pawl spring 67a to return to the erected position automatically. The second rotatable transmission member 76 is rotatably mounted on the fixed shaft 61, and engaged with the carrier 75 for unitary rotation through transmission teeth 76b formed at an end remote from the transmission teeth 76a. The planetary gears 70 are pivotally connected to the carrier 75 to be rotatable about a mounting axis 77 and revolvable about an axis of the carrier 75 with rotation of the carrier 75. The planetary gears 70 are also meshed with a sun gear portion 61a of the fixed shaft 61. The first rotatable transmission member 74 is meshed with the planetary gears 70 through an internal gear 74b formed at an end thereof remote from the ratchet teeth 74a. When the second transmission pawls 67 are erected, the torque of the drive member 2 is transmitted to the second rotatable transmission member 76, and the torque of the carrier 75 is transmitted to the first rotatable transmission member 74 as accelerated by the planetary gears 70. At this time, the first rotatable transmission member 74 rotates faster than the drive member 2 by the accelerating action of the planetary gears 70 and reclination of the first transmission pawls 66. When the second transmission pawls 67 are reclined, the torque of the drive member 2 is transmitted to the first rotatable transmission member 74 through the first transmission pawls 66, and the torque of the first rotatable transmission member 74 is transmitted to the carrier 75 as decelerated by the planetary gears 70.

Figure 28:
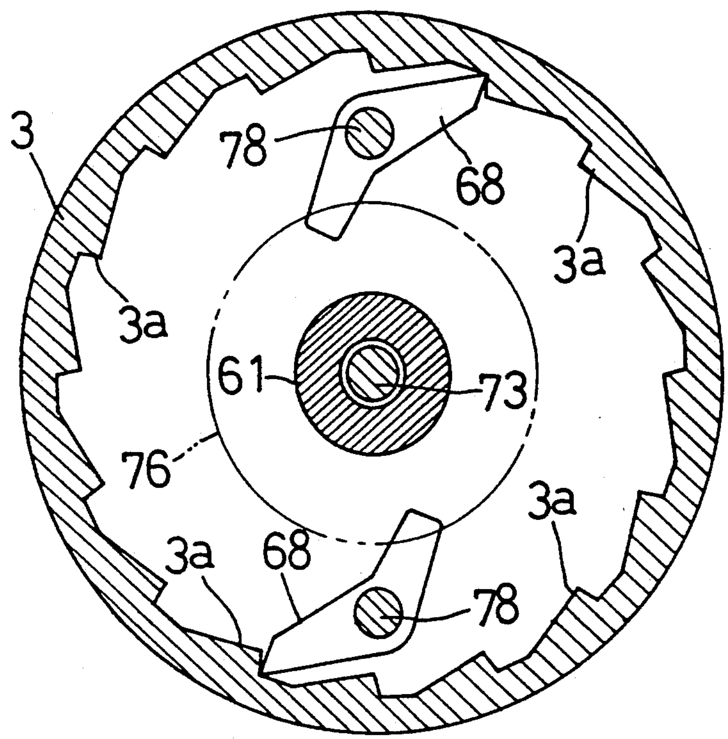
FIG. 28 is a sectional view showing relations among a hub body, third transmission pawls and a fixed shaft.

As shown in FIG. 28, the third transmission pawls 68 are attached to the first rotatable transmission member 74 through pivotal axes 78 to be revolvable with rotation thereof and pivotable between an erected position and a reclined position. In the erected position the third transmission pawls 68 have distal ends thereof engaging transmission teeth 3a of the hub body 3 to transmit torque from the first rotatable transmission member 74 to the hub body 3. In the reclined position, the distal ends of the third transmission pawls 68 are disengaged from the hub body 3 to break the torque transmission from the first rotatable transmission member 74 to the hub body 3. The third transmission pawls 68 are biased by a pawl spring 68a to return to the erected position automatically.

The fourth transmission pawls 69 are attached to the carrier 75 to be revolvable with rotation thereof and pivotable between an erected position and a reclined position. The fourth transmission pawls 69 are in the form of ratchet pawls biased by a pawl spring 69a to the erected position with distal ends thereof engaging driven ratchet teeth 3b of the hub body 3. A difference in rotating rate between the carrier 75 and hub body 3 automatically switches the fourth transmission pawls 69 between the erected, driving position and reclined, non-driving position. In the erected position the fourth transmission pawls 69, under the biasing force, engage the ratchet teeth 3b to transmit torque from the carrier 75 to the hub body 3. In the reclined position the fourth transmission pawls 69 are pushed by the ratchet teeth 3b away from the hub body 3 to allow rotation thereof relative to the carrier 75.

Thus, by switching the second transmission pawls 67 and third transmission pawls 68 between the erected position and reclined position, the first and fourth transmission pawls 66 and 69 are switchable between the driving position and rotation-allowing position. This, combined with the change speed function of the planetary gears 70, provides the three speeds, i.e. the high, intermediate and low speeds, of transmission from the drive member 2 to the hub body 3, as shown in Table 2 set out hereinafter.

Specifically, when the second transmission pawls 67 and third transmission pawls 68 are both erected, the torque of the drive member 2 is transmitted to the hub body 3 through the second transmission pawls 67, second rotatable transmission member 76, carrier 75, planetary gears 70, first rotatable transmission member 74 and third transmission pawls 68. This state produces the high speed.

When the second transmission pawls 67 are reclined and the third transmission pawls 68 are erected, the torque of the drive member 2 is transmitted to the hub body 3 through the first transmission pawls 66, first rotatable transmission member 74 and third transmission pawls 68. This state produces the intermediate speed.

When the second transmission pawls 67 and third transmission pawls 68 are both reclined, the torque of the drive member 2 is transmitted to the hub body 3 through the first transmission pawls 66, first rotatable transmission member 74, planetary gears 70, carrier 75 and fourth transmission pawls 69. This state produces the low speed.

The change speed control mechanism E includes the first control cam 71 for controlling the second transmission pawls 67, the second control cam 72 for controlling the third transmission pawls 68, a coil type feed spring 79 disposed between the first control cam 71 and ball pushing element 62, a coil type return spring 80 disposed between the second control cam 72 and sun gear portion 61a, the control rod 73 mounted inside the fixed shaft 61, and a speed controller 83 operatively connected to the control rod 73 through an interlocking mechanism 81 and a control wire 82. The speed controller 84 includes a shift lever 84 operable to slide the control rod 73 to produce a selected speed.

Figure 25:
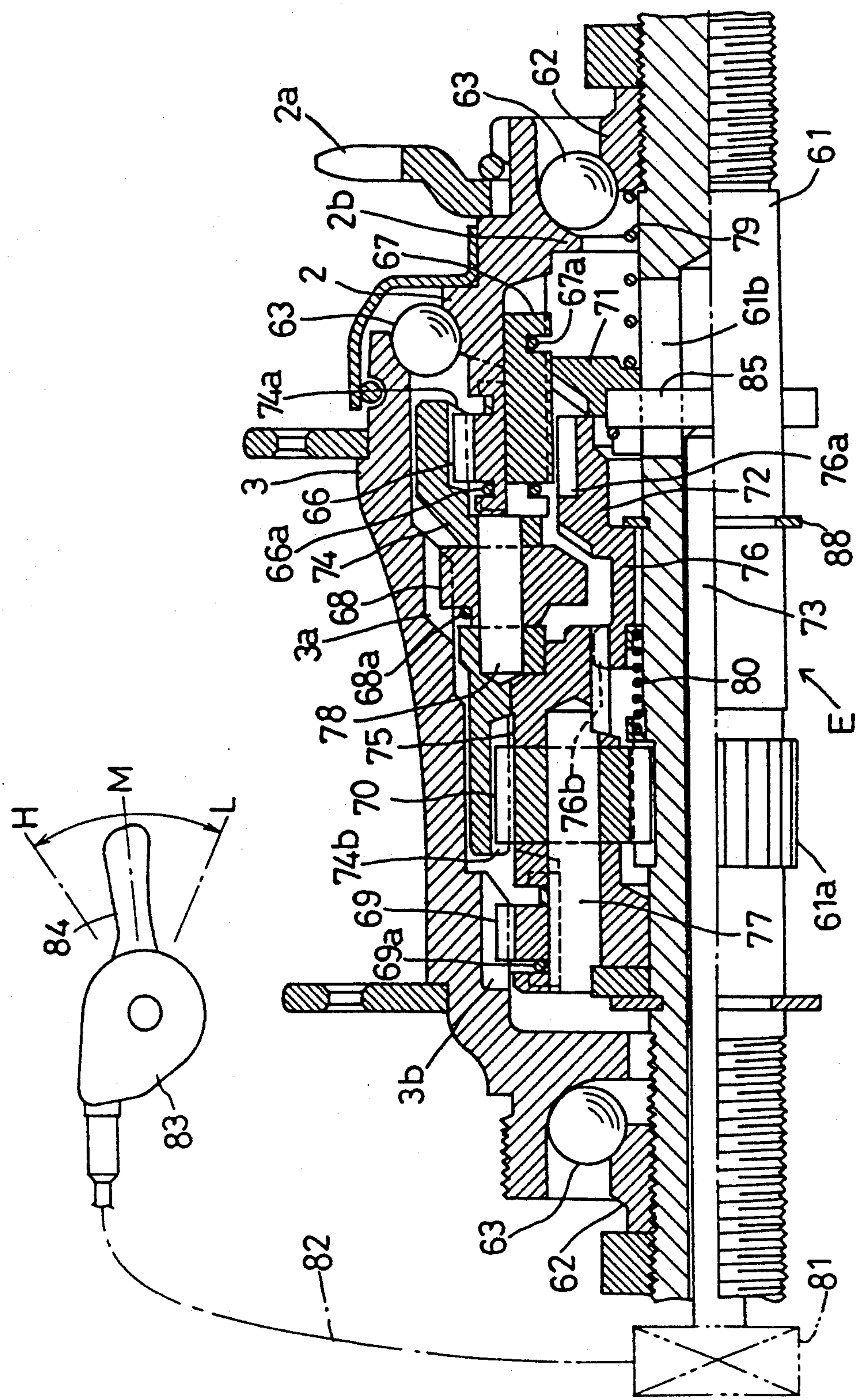
FIG. 25 is a sectional view of the three-stage change speed apparatus in an intermediate speed state.
Figure 26:
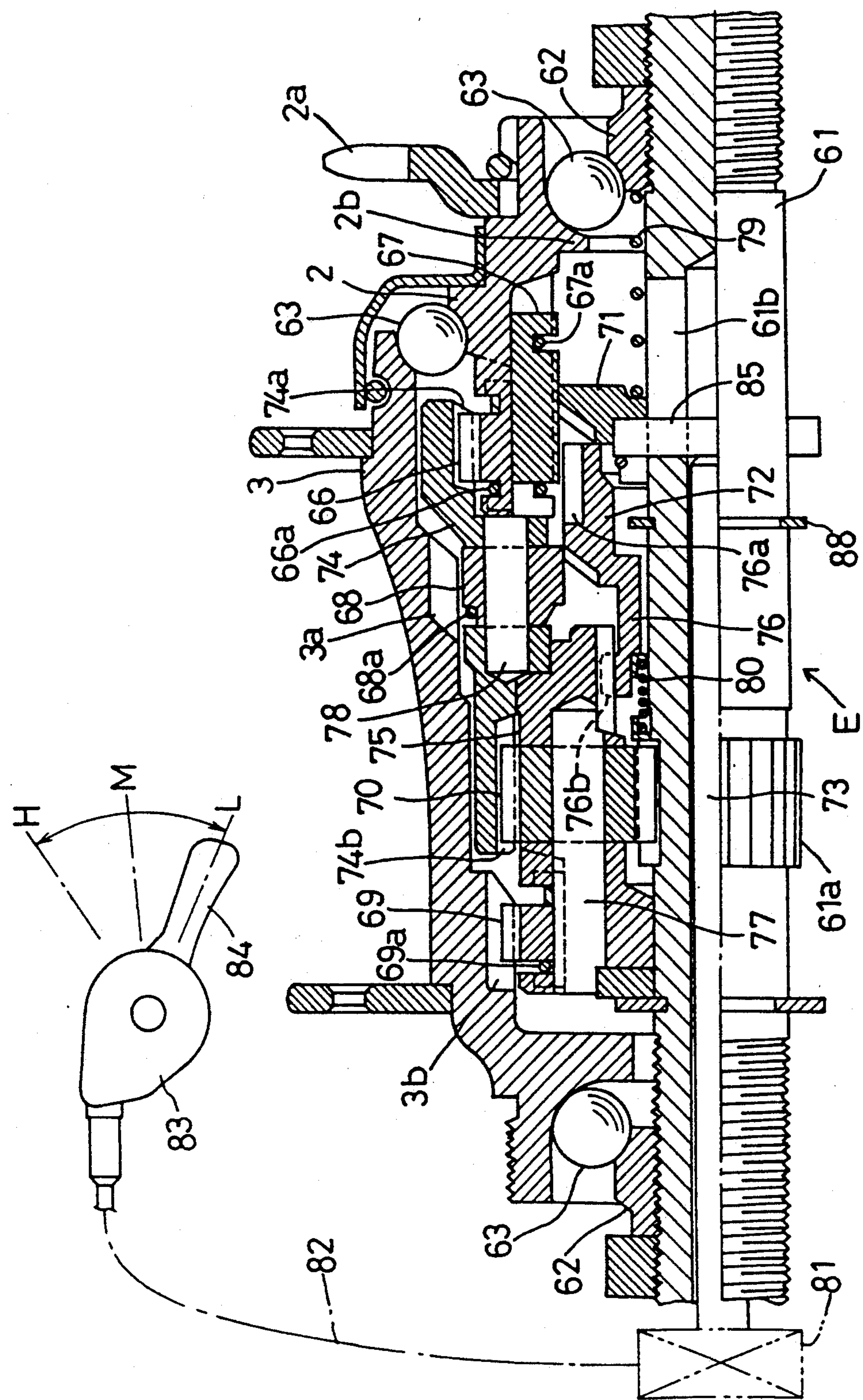
FIG. 26 is a sectional view of the three-stage change speed apparatus in a low speed state.
Figure 30:
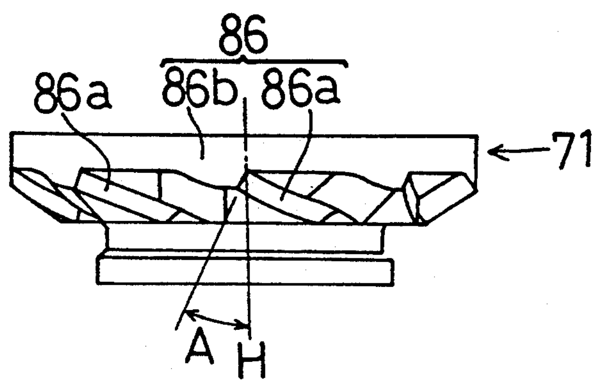
FIG. 30 is a plan view of the first control cam.
Figure 31:
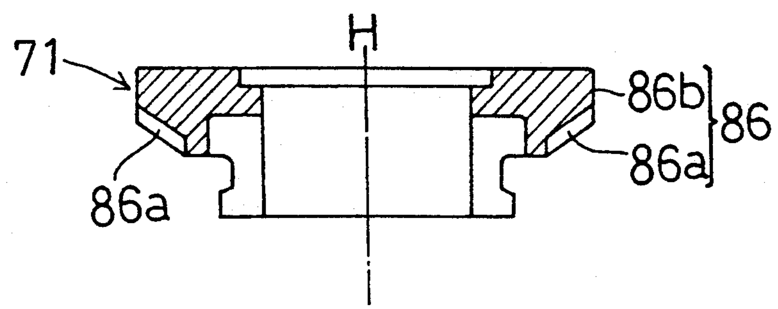
FIG. 31 is a sectional view of the first control cam taken on line R—R of FIG. 29.

The first control cam 71 is mounted on the fixed shaft 61 to be slidable axially thereof and not to be rotatable relative thereto by a rotation stopper 85. The first control cam 71 is slidable between a pawl erecting position as shown in FIG. 24 and a pawl reclining position as shown in FIGS. 25 and 26. In the pawl erecting position, the first control cam 71 contacts a stopper portion 2b of the drive member 2, with a cam surface 86 of the first control cam 71, as shown in FIG. 30, separated from the second transmission pawls 67 to allow the second transmission pawls 67 to be erected by the force of the pawl spring 67a. In the pawl reclining position, the cam surface 86 of the first control cam 71 pushes the second transmission pawls 67 to the reclined, non-driving position. The rotation stopper 85 is slidable relative to the fixed shaft 61 along a rotation stopper receiving groove 61b formed therein, to allow the sliding movement of the first control cam 71.

Figure 33:
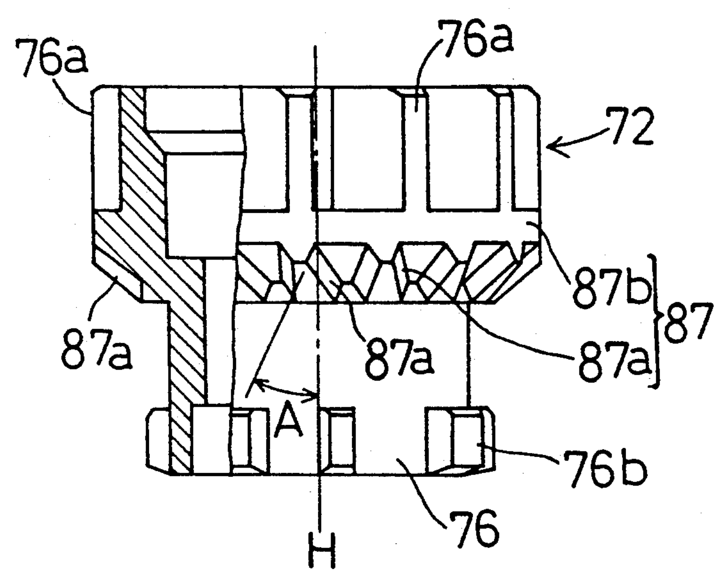
FIG. 33 is a plan view, partly in section, of the second control cam.

The second control cam 72 is defined by a large diameter portion of the second rotatable transmission member 76. The second control cam 72 is slidable axially of the fixed shaft 61 with sliding movement of the second rotatable transmission member 76 while in engagement with the carrier 75. The second control cam 72 is slidable between a pawl erecting position as shown in FIGS. 24 and 25 and a pawl reclining position as shown in FIG. 26. In the pawl erecting position, the second control cam 72 contacts a stopper ring 88 on the fixed shaft 61, with a cam surface 87 of the second control cam 72, as shown in FIG. 33, separated from the second transmission pawls 67 to allow the third transmission pawls 68 to be erected by the force of the pawl spring 68*a*. In the pawl reclining position, the cam surface 87 of the first control cam 72 pushes the third transmission pawls 68 to the reclined, non-driving position.

Figure 34:
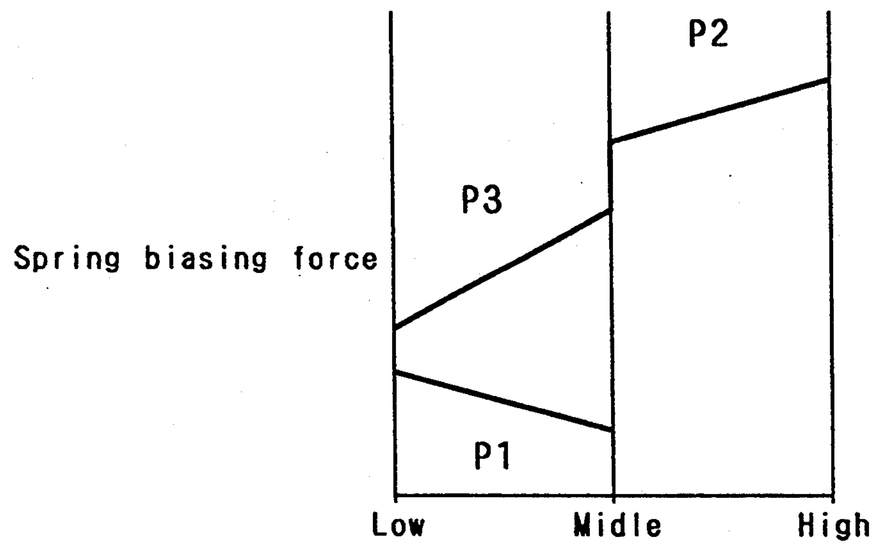
FIG. 34 is an explanatory view of a spring biasing force.

The return spring 80 biases the second control cam 72 to return to the pawl erecting position automatically. The return spring 80 applies to the second control cam 72 a biasing force P1 which is variable, as shown in FIG. 34, with the sliding movement of the second control cam 72. The feed spring 79 applies a biasing force P2 as shown in FIG. 34 to the first control cam 71 to bias the first control cam 71 to the pawl reclining position until the main apparatus portion switches from the high speed state to the intermediate speed state. After the main apparatus portion switches from the high speed state to the intermediate speed state, the feed spring 79 applies a biasing force P3 as shown in FIG. 34 to the second control cam 72 to bias the second control cam 72 from the pawl erecting position to the pawl reclining position. The biasing force P3 is applied through the first control cam 71 contacting the second control cam 72, while the biasing force P1 is applied from the return spring 79.

As shown in FIGS. 24 through 26, when the shift lever 84 is operated, its operating force is transmitted to the control rod 73 through the control wire 82 and interlocking mechanism 81. Then the control rod 73 slides inwardly of the fixed shaft 61 for pushing the rotation stopper 85 against the force of the feed spring 79 to switch the first control cam 71 and for switching the second control cam 72 against the force of the return spring 80. Or the control rod 73 slides outwardly of the fixed shaft 61 for allowing the feed spring 79 to switch the first and second control cams 71 and 72. The speed controller 83 has a shift lever locking function to retain the control rod 73 in a selected position to maintain the first control cam 71 in the pawl reclining position or pawl erecting position against the force of the feed spring 79.

Specifically, referring to FIGS. 24 through 26, when the shift lever 83 is operated to a high speed position H, the control rod 73 is moved to the position shown in FIG. 24. The control rod 73 then places the first control cam 71 in the pawl erecting position to erect the second transmission pawls 67, while the return spring 80 places the second control cam 72 in the pawl erecting position to erect the third transmission pawls 68. This state produces the high speed.

When the shift lever 83 is operated to an intermediate speed position M, the control rod 73 is moved to the position shown in FIG. 25. Then the first control cam 71 moves to the pawl reclining position under sliding action by the elastic restoring force of the feed spring 79 and stopping action of the control rod 73, to recline the second transmission pawls 67, while the return spring 80 places the second control cam 72 in the pawl erecting position to erect the third transmission pawls 68. This state produces the intermediate speed.

When the shift lever 83 is operated to a low speed position L, the control rod 73 is moved to the position shown in FIG. 26. The first control cam 71 is placed in the pawl reclining position under sliding action by the elastic restoring force of the feed spring 79 and stopping action of the second control cam 72, to recline the second transmission pawls 67. The second control cam 72 is placed in the pawl reclining position under sliding action by the elastic restoring force of the feed spring 79, to recline the third transmission pawls 68. This state produces the low speed.

TABLE 2

| 1st cam | 2nd cam | 2nd pawls | 3rd pawls | speed |
|---|---|---|---|---|
| erect | erect | erected | erected | H |
| recline | erect | reclined | erected | I |
| recline | recline | reclined | reclined | L |

Each of the cam surface 86 of the first control cam 71 and the cam surface 87 of the second control cam 72 includes a plurality of first cam surfaces 86*a* arranged circumferentially of the control cam 71 or 72 for reclining the transmission pawls 67 or 68, and a second cam surface 86*b* or 87*b* continuous circumferentially of the control cam 71 or 72 for maintaining the transmission pawls 67 or 68 in the reclined position.

Figure 29:
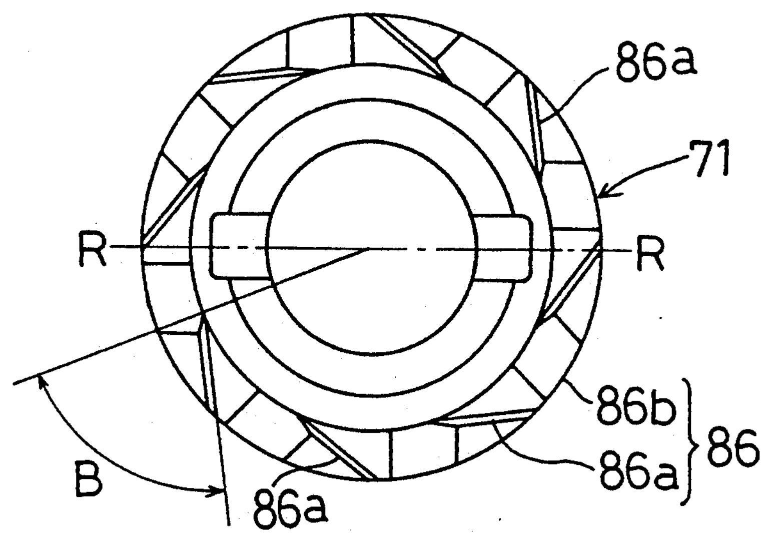
FIG. 29 is a front view of a first control cam.
Figure 32:
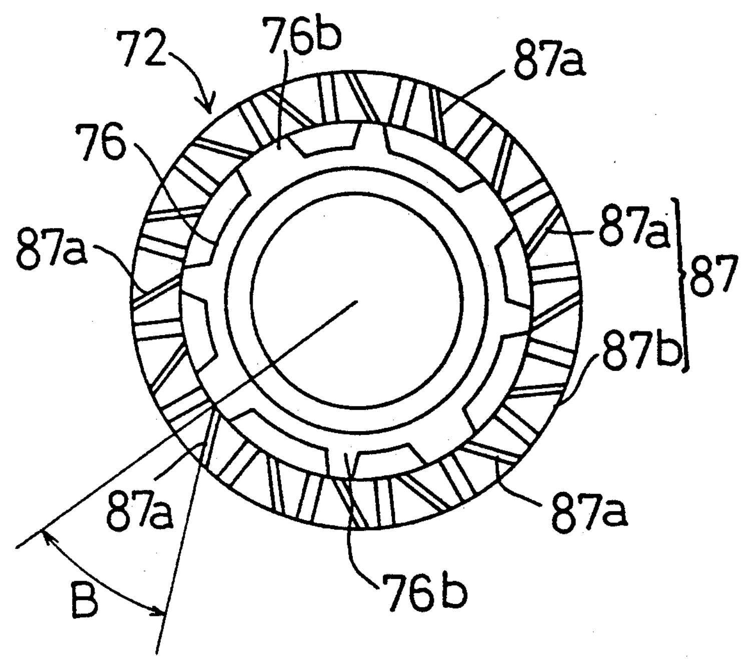
FIG. 32 is a front view of a second control cam.

Each of the first cam surfaces 86*a* and 87*a* defines an inclined flat surface having a first inclination angle A with respect to a sliding axis H of the control cam 71 or 72 as shown in FIG. 30 or 33 and a second inclination angle B as shown in FIG. 29 or 32. Because of this angular arrangement, the transmission pawls 67 or 68 are reclined by relative slides between the control cam 71 or 72 and transmission pawls 67 or 68 either axially or circumferentially of the drive member 2 or the first rotatable transmission member 74. As the first control cam 71 and second control cam 72 slide from the respective pawl erecting position to contact the transmission pawls 67 or 68, the transmission pawls 67 or 68 are reclined by the reclining action based on the camming action due to the first inclination angle A and by the reclining action based on the combination of revolution of the transmission pawls 71 or 72 on the drive member 2 or the first rotatable transmission member 74 and the camming action due to the second inclination angle B. Thus, the transmission pawls 67 or 68 are switchable to the reclined, non-driving position quickly relative to the sliding stroke and sliding force of the control cam 71 or 72.

The spring 79 imparts a pawl operating force to the control cams 71 and 72 and, as described in relation to the preceding embodiment, maximum driving torques which may occur when the transmission pawls 67 and 68 are reclined are substantially the same whichever pawls are reclined. Therefore, when an attempt is made to change speed while pedaling the bicycle, this is effected only with the crank (not shown) approaching or reaching a low drive load position at or adjacent the upper or lower dead point.

Figure 18:
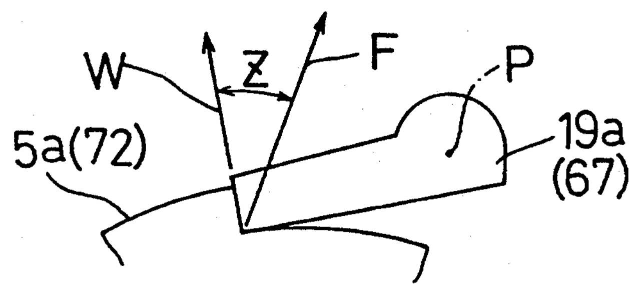
FIG. 18 is a side view of a transmission pawl.
Figure 19:
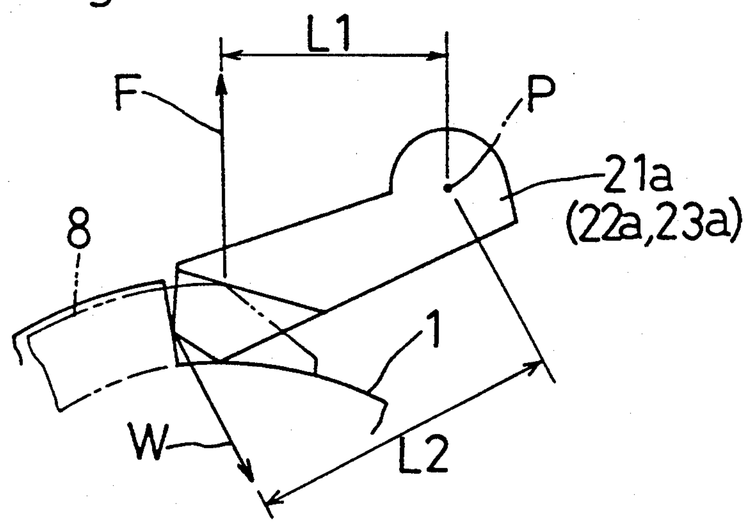
FIG. 19 is a side view of a sun pawl.
Figure 20:
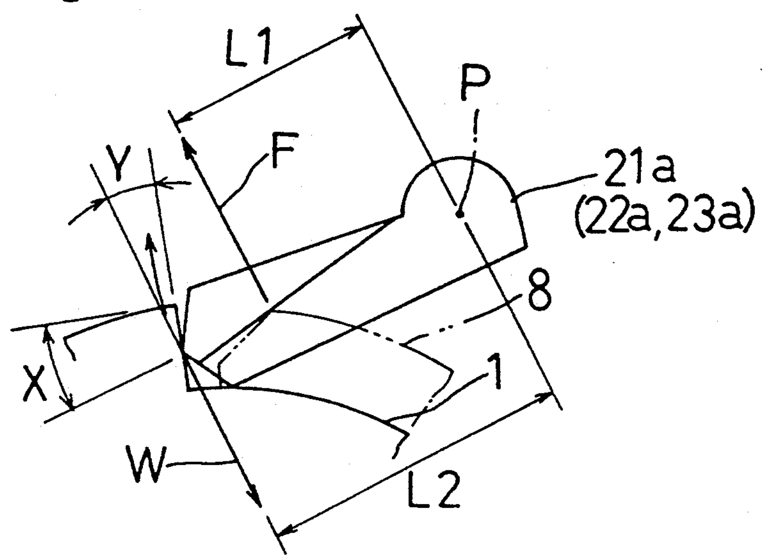
FIG. 20 is a side view of the sun pawl.
Figure 35:
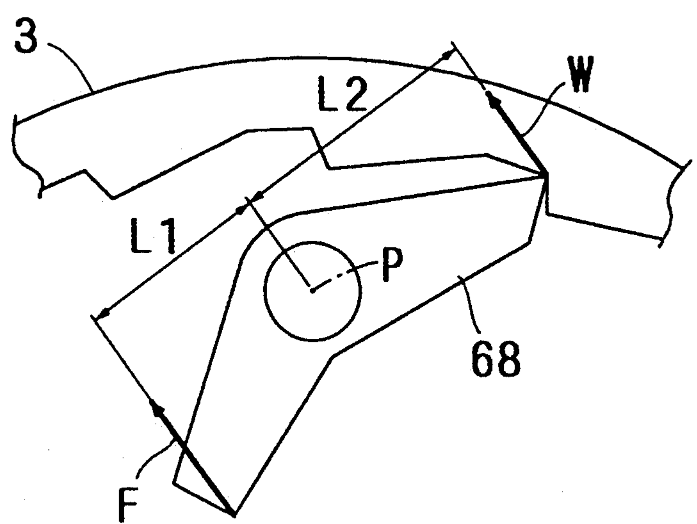
FIG. 35 is a front view showing configuration of a third transmission pawl.

Factors for torque equalization include the first inclination angles A and second inclination angles B shown in FIGS. 29 through 33 as well as the cam angle Z of the second transmission pawls 67 as shown in FIG. 18, and a first arm length L1 and a second arm length L2 of the third transmission pawls 68 as shown in FIG. 35.

The cam angle Z is a relative angle between resistance W to disengagement due to the engagement between the transmission pawls 67 and rotatable transmission member 76 and reclining force F of the first control cam 71. The cam angle Z is variable with the first inclination angle A and second inclination angle B of the control cam 72.

The first arm length L1 is a distance between a pivotal axis P of erection and reclination and a point at which the reclining force F of the second control cam 72 is applied. The second arm length L2 is a distance between the pivotal axis P and a point at which the resistance W to disengagement due to engagement with the hub body 3 is applied. The operating force required to recline the pawls 68 is variable with variations in the ratio between the first arm length L1 and second arm length L2.

The first cam surfaces 86*a* of the first control cam 71 and the first cam surfaces 87*a* of the second control cam 72 have the first inclination angles A and second inclination angles B as set out in Table 3 below. Thus, the first cam surfaces 86*a* and 87*a* have different shapes to differentiate efficiency of the sliding force of the first control cam 71 being applied as the reclining force to the second transmission pawls 67 and efficiency of the sliding force of the second control cam 72 being applied to as the reclining force to the third transmission pawls 68.

TABLE 3

| | 1st angle A | 2nd angle B |
|---|---|---|
| cam surface 86a | about 25° | about 75° |
| cam surface 87a | about 20° | about 40° |

Even when a change speed operation is carried out to allow the feed spring 79 to impart the sliding force to the first control cam 71 and second control cam 72, the feed spring 79 does not elastically restore itself to a predetermined position to switch the first control cam 71 and second control cam 72 to the pawl reclining position if the crank is in a position other than the low drive load position, a drive torque greater than a predetermined torque is applied to the drive member 2, and the second transmission pawls 67 and third transmission pawls 68 receive a resistance to disengagement exceeding the resilience of the spring 79. The feed spring 79 elastically restores itself to the predetermined position to switch the first control cam 71 and second control cam 72 to the pawl reclining position when the crank reaches the low drive load position to reduce the drive torque applied to the drive member 2, and the resistance to disengagement applied to the second transmission pawls 67 and third transmission pawls 68 falls below the resilience of the spring 79.

The maximum driving torques occurring when the transmission pawls 67 and 68 are reclined are substantially the same whichever pawls are reclined, in spite of the difference between a maximum resistance to disengagement for enabling disengagement of the second transmission pawls 67 from the second control cam 72 and a maximum resistance to disengagement for enabling disengagement of the third transmission pawls 68 from the hub body 3, and in spite of the same spring 79 applying the operating force to the control cams 71 and 72. This is achieved by reason of the cam angle Z and arm lengths L1 and L2 of the second transmission pawls 67 and third transmission pawls 68 and the first inclination angles A and second inclination angles B of the control cams 71 and 72.

What is claimed is:

1. A self-contained change speed apparatus for a bicycle comprising:
   - a fixed shaft;
   - a drive member and a hub body rotatably supported on said fixed shaft; and
   - change speed means interposed between said drive member and said hub body, said change speed means including
     - a plurality of clutches subjected to a resistance to disengagement corresponding to a drive torque,
     - clutch control means having a shiftable first control member, an elastic member for storing a shift of said first control member as energy, and a shiftable second control member operable by said elastic member for operating said clutches, and
     - equalizing means for substantially equalizing a force exerted by said elastic member to overcome said resistance to disengagement for all of said clutches;
   - wherein said force exerted by said elastic member, to shift said second control member when said first control member shifts, is greater than said resistance to disengagement adjacent an upper dead point and a lower dead point of pedals, and said second control member shifts and said elastic member imparts a force greater than said resistance to disengagement for shifting said second control member, and remains stationary when said first control member shifts and said elastic member imparts a force less than said resistance to disengagement, said second control member being shiftable to disengage said clutches only when the force of said elastic member exceeds said resistance to disengagement.

2. A self-contained change speed apparatus as claimed in claim 1, wherein said clutches include ratchet pawls movable between an erected position and a reclined position, and teeth engageable with said ratchet pawls.

3. A self-contained change speed apparatus as claimed in claim 1, wherein said change speed means includes a planetary gear mechanism.

4. A self-contained change speed apparatus as claimed in claim 3, wherein one of said clutches is disposed between a sun gear and said fixed shaft, said sun gear being selectively allowed to rotate and prohibited from rotating on said fixed shaft by said clutches including ratchet pawls attached to said sun gear and teeth formed on said fixed shaft.

5. A self-contained change speed apparatus as claimed in claim 3, wherein one of said clutches is disposed between said planetary gear mechanism and said hub body, drive transmission from said planetary gear mechanism to said hub body being selectively allowed and prohibited by said clutches including ratchet pawls attached to said planetary gear mechanism and teeth formed on said hub body.

6. A self-contained change speed apparatus as claimed in claim 2, wherein said ratchet pawls are biased by a spring load for engagement with said teeth, said change speed means including means for reclining said ratchet pawls against said spring load.

7. A self-contained change speed apparatus as claimed in claim 2, wherein said ratchet pawls have a first length between an axis of erection and reclination and a point to which a reclining force is applied, and a second length between said axis of erection and reclination and a point of contact with said teeth, whereby the forces for overcoming said resistance to disengagement are substantially equalized for all of said clutches.

8. A self-contained change speed apparatus as claimed in claim 7, wherein said ratchet pawls have also a selected angle formed between a straight line extending through said axis of erection and reclination and a plane of contact with said teeth, whereby the forces for overcoming said resistance to disengagement are substantially equalized for all of said clutches.

9. A self-contained change speed apparatus as claimed in claim 1, wherein said elastic member is formed of a spring.

10. A self-contained change speed apparatus as claimed in claim 1, wherein the shift of said first control member is transmitted to said second control member through said elastic member.

11. A self-contained change speed apparatus for a bicycle comprising:

a fixed shaft;

a drive member and a hub body rotatably supported on said fixed shaft; and change speed means interposed between said drive member and said hub body, said change speed means including a plurality of clutches subjected to a resistance to disengagement corresponding to a drive torque, and clutch control means having a shiftable first control member, an elastic member for storing a shift of said first control member as energy, and a shiftable second control member operable by said elastic member for operating said clutches;

wherein said second control member shifts to disengage said clutches when said first control member shifts and said elastic member imparts a force greater than said resistance to disengagement for shifting said second control member, and remains stationary when said first control member shifts and said elastic member imparts a force less than said resistance to disengagement, said second control member being shiftable to disengage said clutches only when the force of said elastic member exceeds said resistance to disengagement; and wherein said clutches are shaped and arranged such that the force of said elastic member for overcoming said resistance to disengagement is substantially the same for all of said clutches; and wherein the force of said elastic member for shifting said second control member is greater than said resistance to disengagement adjacent an upper dead point and a lower dead point of pedals.

* * * * *